US011795905B1

(12) United States Patent
Bein

(10) Patent No.: US 11,795,905 B1
(45) Date of Patent: Oct. 24, 2023

(54) OCEAN WAVE ENERGY ABSORBING PANEL

(71) Applicant: Poseidon's Kite, LLC, Arlington, VA (US)

(72) Inventor: Thomas Bein, Arlington, VA (US)

(73) Assignee: Poseidon's Kite LLC, Arlington, VA (US)

( * ) Notice: Subject to any disclaimer, the term of this patent is extended or adjusted under 35 U.S.C. 154(b) by 0 days.

(21) Appl. No.: 18/223,934

(22) Filed: Jul. 19, 2023

(51) Int. Cl.
*F03B 13/18* (2006.01)

(52) U.S. Cl.
CPC .................................. *F03B 13/188* (2013.01)

(58) Field of Classification Search
CPC .................................................... F03B 13/188
See application file for complete search history.

(56) References Cited

U.S. PATENT DOCUMENTS

| | | | |
|---|---|---|---|
| 1,960,622 | A | 5/1934 | Du Pont |
| 4,170,738 | A | 10/1979 | Smith |
| 4,313,059 | A | 1/1982 | Howard |
| 4,371,788 | A * | 2/1983 | Smith, Jr. ............ F03B 13/185 60/507 |
| 6,254,034 | B1 | 7/2001 | Carpenter |
| 6,498,402 | B2 | 12/2002 | Saiz |
| 6,555,931 | B2 | 4/2003 | Mizzi |
| 6,731,018 | B1 | 5/2004 | Grinsted |
| 6,756,695 | B2 | 6/2004 | Hibbs |
| 6,948,911 | B1 | 9/2005 | Laughton |
| 7,023,104 | B2 | 4/2006 | Kobashikawa |
| 7,650,749 | B2 | 1/2010 | Borgesen |

(Continued)

FOREIGN PATENT DOCUMENTS

| | | |
|---|---|---|
| CN | 103147905 A | 6/2013 |
| CN | 103437943 A | 12/2013 |

(Continued)

OTHER PUBLICATIONS

Deborah Greaves, et al.,"Flexible Responsive Systems in Wave Energy: FlexWave" Supergen ORE Hub: Fourth Annual Assembly, Jan. 18-20, 2022. https://supergen-ore.net/uploads/Deborah-Greaves-Flexwave-Jan-2022.pdf.

(Continued)

*Primary Examiner* — Viet P Nguyen
(74) *Attorney, Agent, or Firm* — Barcelo, Harrison & Walker LLP

(57) ABSTRACT

In certain embodiments, an ocean wave energy extraction system including a wave energy panel may capture kinetic energy from an ocean wave as a force applied to a flexible membrane that drives the WEP back and forth in a reciprocating motion. The WEP dimensions may be selected so that the energy extracted from the wave is maximized and the added mass is minimized. A flexible membrane may be supported on two opposite edges by structural members that may pivot about a base. The shape of the flexible membrane may reciprocate in response to alternating horizontal wave orbital velocities. The force applied to the flexible membrane may be transmitted through the structural members to a power extraction device, such as a hydraulic pump or an electrical generator, that may be mounted to the base. Multiple WEPs may be arranged parallel to the wave crest to produce additional power.

28 Claims, 16 Drawing Sheets

(56) References Cited

U.S. PATENT DOCUMENTS

| | | |
|---|---|---|
| 8,018,079 B2 | 9/2011 | Kelly |
| 8,102,069 B2 | 1/2012 | Steelman |
| 8,120,195 B2 | 2/2012 | Pollack |
| 8,169,093 B2 | 5/2012 | Griffin |
| 8,193,651 B2 | 6/2012 | Lightfoot |
| 8,206,113 B2 | 6/2012 | Ryynanen |
| 8,277,146 B2 | 10/2012 | Spedal |
| 8,456,030 B2 | 6/2013 | Chi |
| 9,109,570 B2 | 8/2015 | Jarvinen |
| 9,739,257 B2 | 8/2017 | Bateman |
| 9,752,553 B2 | 9/2017 | Bein |
| 10,066,595 B2 | 9/2018 | Thresher |
| 10,072,630 B2 | 9/2018 | Bein |
| 10,662,918 B2 | 5/2020 | Thresher |
| 11,174,831 B2 | 11/2021 | Resio |
| 11,401,910 B2 | 8/2022 | Boren |
| 11,434,863 B2 | 9/2022 | Hou |
| 2002/0040948 A1 | 4/2002 | Ragner |
| 2003/0001392 A1 | 1/2003 | Gerber |
| 2004/0007881 A1 | 1/2004 | Kobashikawa |
| 2007/0120004 A1 | 5/2007 | Olson |
| 2007/0228738 A1 | 10/2007 | Wrage |
| 2008/0093852 A1 | 4/2008 | Vowles |
| 2009/0015014 A1 | 1/2009 | Ddevaney |
| 2009/0056327 A1 | 3/2009 | Raikamo |
| 2009/0140524 A1 | 6/2009 | Kejha |
| 2010/0111609 A1 | 5/2010 | Espedal |
| 2010/0264270 A1 | 10/2010 | Mears |
| 2010/0276934 A1 | 11/2010 | Francis |
| 2010/0295302 A1 | 11/2010 | Martin |
| 2011/0031750 A1 | 2/2011 | Kreissig |
| 2011/0042955 A1 | 2/2011 | Bateman |
| 2011/0210559 A1 | 9/2011 | Zanetti |
| 2011/0298215 A1 | 12/2011 | Wille |
| 2012/0212350 A1 | 8/2012 | Magnell |
| 2013/0008158 A1 | 1/2013 | Hon |
| 2016/0061180 A1 | 3/2016 | Eavis |
| 2023/0015439 A1 | 1/2023 | Sun |

FOREIGN PATENT DOCUMENTS

| | | |
|---|---|---|
| CN | 107664092 A | 2/2018 |
| WO | 2009097000 A1 | 8/2009 |
| WO | 2010122292 A2 | 10/2010 |

OTHER PUBLICATIONS

Robin Whitlock, "The President of the Island Council of Tenerife, Carlo Alonso, has just signed an agreement with Julius Espedal, the CEO of Norwegian marine energy company Langlee Wave Power, to promote wave power on the island" https://www.renewableenergymagazine.com/ocean_energy/tenerife-to-install-wave-energy-plants-20140305.

* cited by examiner

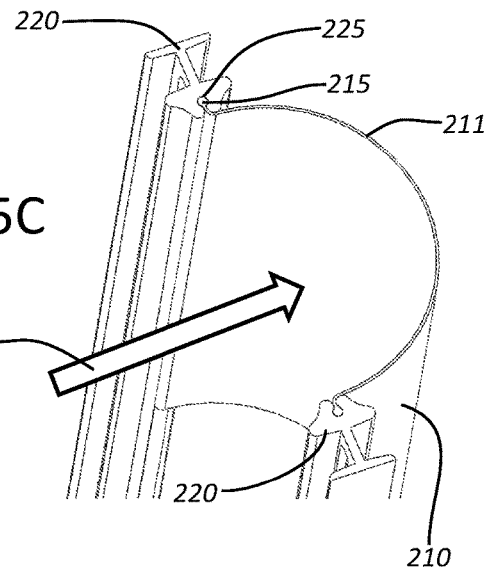
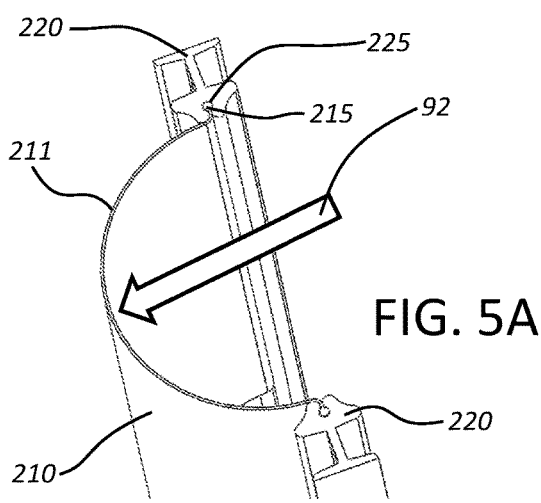

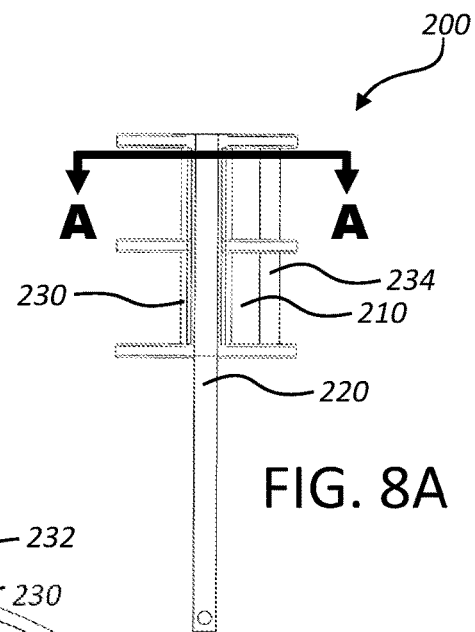
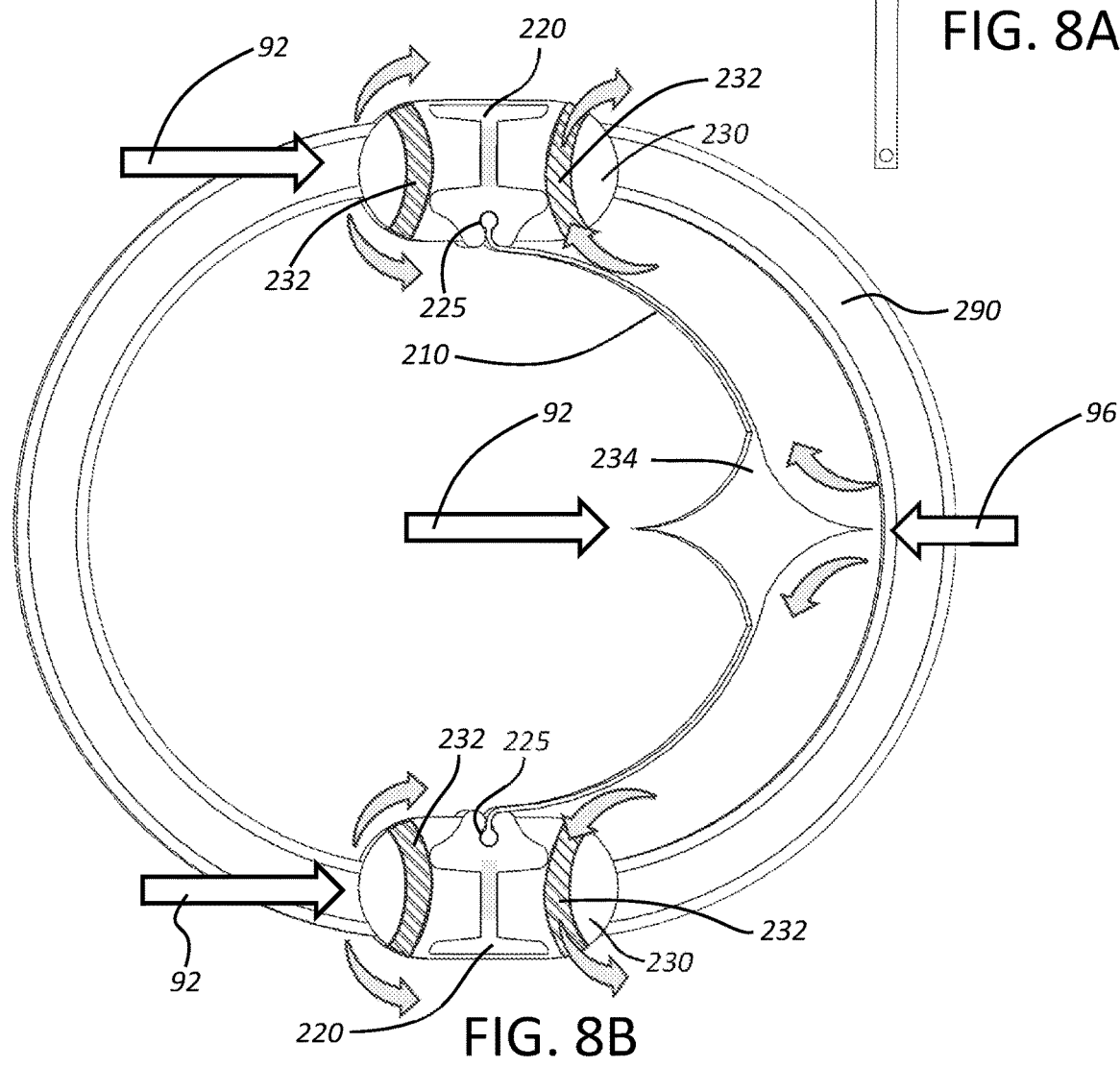
FIG. 8A
FIG. 8B

OCEAN WAVE ENERGY ABSORBING PANEL

FIELD OF THE INVENTION

The present invention relates generally to ocean wave energy converters and more specifically to an ocean wave energy power generation system that efficiently harnesses the kinetic energy of ocean waves to produce power.

BACKGROUND OF THE INVENTION

Ocean waves that reach the shoreline of a land mass are primarily generated by wind pushing on the water surface far from land, but the energy contained in such waves is unpredictable, for a number of reasons. Unlike the predictable energy that can be extracted from water motion that is caused by tides, wave energy is subject to numerous modifying factors. For example, typically the wind will generate multiple waves which interact with each other in a random pattern, forming what is referred to as a fully developed sea. Accordingly, wave energy converters, unlike tidal energy converters, must be able to adjust to different wave characteristics so that a maximum amount of energy can be extracted.

The surface of a single wave as it moves across the ocean bottom can be broadly described mathematically as equivalent to sinusoidal motion. However, it can be observed from the motion of the water that there are both vertical and horizontal components of velocity in a wave. The vertical component of velocity causes the wave to rise above and to fall below a mean waterline, while the horizontal component of wave velocity causes the wave crest to move in the direction of the wave propagation. It is less obvious that there is also a horizontal component of velocity opposite to the direction of wave propagation. These velocities can be depicted as four points along a wave in its direction of propagation, where the velocities are either horizontal or vertical. At the point of maximum wave amplitude, referred to as the wave peak, the velocity is horizontal in the direction of the wave propagation. Moving forward of the wave peak to the mean water line the velocity is vertically upward. At a point of minimum wave amplitude, referred to as the wave trough, the velocity is horizontal in the direction opposite to the wave propagation. Returning to the mean water line, the velocity is vertically downward.

The combination of these velocity vectors creates a circular velocity pattern, referred to as the orbital velocity. In deep water, the energy of a wave is split between the potential energy, which is the vertical motion in the direction of the rise and fall of the water surface, and the kinetic energy, which is the motion of the water parallel to the direction of wave propagation. The orbital velocities are strongest at the water surface and decay down to zero at a depth of approximately one-half the wavelength, which is the distance between the peaks (or the valleys) of adjacent waves. In shallow water, where the water depth is less than one-half the wavelength, the orbital velocities extend down to the ocean bottom. As the water depth becomes shallower than one-half of the wavelength, the orbital velocity paths are compressed in the vertical direction, which flattens the paths into ovals.

The power in a single wave, per unit length of the wave ("Theory and Application of Ocean Surface Waves, Part 1: Linear Aspects", 3rd Edition, 2017, page 404), may be expressed as:

$$P = \frac{\rho * g^2 * a^2 * T}{8 * \pi}$$

Where:
P=power(kW/m)
ρ=the water density (kg/m^3)
g=acceleration of gravity (m/sec^2)
a=Wave amplitude (m)
T=Wave period (sec)
π=constant=3.14159

From inspection of the equation above, it can be seen that the power of the wave is proportional to the wave amplitude squared. The wave amplitude is defined as the distance from the undisturbed mean water line to the top of the wave. The consequence of this relationship to a wave energy converter is that waves which are one-half the design wave amplitude will produce one-quarter the power. Similarly, wave amplitudes which are twice the design wave amplitude will result in four times the power. From this relationship it is recognized that the large waves generated during a storm can easily overpower a wave energy converter designed for a typical wave height.

Numerous wave energy converters have been proposed and put into service. The devices strive to capture either the kinetic energy of a wave, the potential energy, or a combination of the two. Wave energy converters may be divided into groups defined by how the wave energy is captured or absorbed. These groups may include without limitation:

Attenuator—two floating devices connected by a pivot point that is parallel to the waves and bends due to passing waves.

Oscillating Water Column—a partially submerged chamber that focuses the wave energy when the wave enters the open end and forces air out of a smaller opening.

Oscillating Wave Surge Converter—a substantially vertical surface mounted to an arm that is attached to a pivot on the sea bottom which moves back and forth due to the passing waves.

Overtopping Device—a perimeter raised above the water surface allows waves to wash over the perimeter, thus raising the confined water level; energy is recovered when water is returned to the normal sea level.

Point Absorber—a float that rides up and down a vertical column due to passing waves.

Submerged Pressure Differential—the alternating pressure on the seafloor due to the rising and falling wave height are used to drive a mechanism.

Rotating Mass—the rising and falling waves are used to cause an eccentric weight to rotate about an axis.

In order to be viable in the marketplace, the Levelized Cost of Energy (LCOE) of the wave energy converter must be competitive with wind and solar and other mature forms of renewable energy, and non-renewable energy including coal, liquid fuels and gaseous fuels. The LCOE is the combination of the fabrication, installation, operating, and maintenance costs with the availability of the power output of a wave energy converter. Many of the prior wave energy converters rely on a large rigid volume that floats and is acted on by waves. The efficiency of these devices has been improved by optimizing the geometry, buoyancy, inertia, momentum, and control of power absorbed from the wave. Even with these improvements the wave energy converters have to be designed to withstand extreme weather events, which drives the fabrication and installation costs beyond the competitive range. As a result, implementation of these wave energy converters has been limited to prototypes.

BRIEF DESCRIPTION OF THE DRAWINGS

FIG. 5A, FIG. 5B, and 5C illustrate an isometric view of an energy absorbing panel reversing direction in accordance with certain embodiments.

FIG. 8B illustrates a cross section view, cut as shown in FIG. 8A, of a wave energy panel with streamlined fairings on the panel supports in accordance with the certain embodiments.

DETAILED DESCRIPTION

Figure 1A:
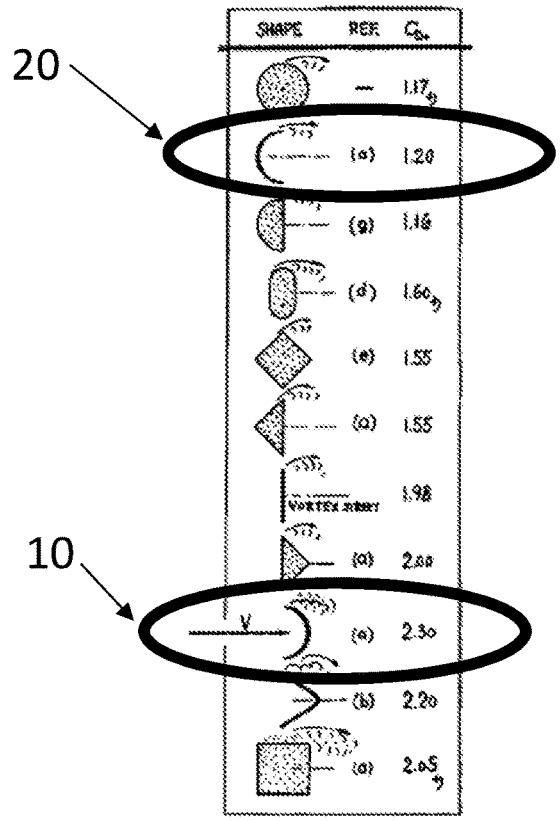
FIG. 1A are the laboratory measurements of drag coefficient of 2-dimensional shapes compiled by Hoerner.

In certain embodiments, a wave energy converter is provided, which overcomes the above deficiencies by capturing wave kinetic energy as a force on a submerged flexible panel and transmits the force through a rigid structure to means that convert the force to either fluid power or electrical power.

In certain embodiments, a wave energy converter may be improved by selecting the size of the flexible panel so that the force required to push the panel through the water, referred to as the added mass, is minimized.

In certain embodiments, a wave energy converter may include a panel whose surface is a flexible membrane that changes shape when the direction of the orbital velocity reverses to maximize the drag of the impinging orbital velocity while minimizing the drag due to pushing the panel through the water.

In certain embodiments, a wave energy converter may include a panel that minimizes the distance that the flexible membrane moves to reverse its shape when the orbital velocity reverses.

In certain embodiments, a wave energy converter may include vertical supports on opposite edges of the flexible membrane that also transmit the force absorbed from the wave orbital velocity to means to convert the force into power, such as a hydraulic pump or an electrical generator.

In certain embodiments, a wave energy converter may include a flexible membrane that increases the drag of the surface being impacted by the orbital velocities and to decrease the drag of the opposite surface being pushed through the water.

In certain embodiments, a wave energy converter may include panel supports that increase the drag of the side of the flexible membrane being impacted by the orbital velocities and to decrease the drag of the opposite side of the flexible membrane being pushed through the water.

In certain embodiments, a wave energy converter may survive extreme sea conditions without damage by lowering the wave energy panel below the water surface to reduce the forces applied by the orbital velocities.

In certain embodiments, a wave energy converter may be able to survive a storm without damage by rotating the wave energy panel to a horizontal orientation so that the panel is close to the seafloor to reduce the forces applied by the orbital velocities.

In certain embodiments, a wave energy converter, referred to as a wave energy panel (WEP) may be installed in a location where it is subjected to suitable wave motion, and which may be a location in an ocean. In certain embodiments, to be considered for ocean wave energy conversion, an installation site (or situs) may demonstrate consistent wave action throughout the course of a year. The energy converter of the present invention may utilize a method for efficiently harnessing the kinetic energy of ocean waves to generate power by reciprocating in response to the horizontal vectors of motion of ocean waves. The WEP may be configured to capture energy from ocean waves at a selected situs having an ocean mean waterline above an ocean bottom surface, meaning the situs may have a mean depth, defined as the substantially vertical distance from the elevation level of ocean bottom or sea floor to the elevation level of the undisturbed sea surface at the situs. Certain embodiments may solve the problems associated with existing wave energy converters and provides a highly efficient, easily produced, easily installed, scalable wave energy converter which, when submerged at a situs in an ocean, may produce power from a wide range of depths and wave heights.

In certain embodiments, when the WEP is installed in situs locations where the water depth is between one-quarter and one-half of the wavelength, the foundation of the WEP may be aligned substantially parallel to the shoreline. When the raised portion of a wave, referred to as the peak, approaches the WEP, the orbital velocities below the surface of the water may push the WEP along with the wave toward the shore. When the peak passes the WEP and the wave's trough approaches the WEP, the orbital velocities may change direction and push the WEP in the direction opposite to the direction of the wave travel and away from the shore. In this way the WEP may reciprocate or oscillate back and forth as waves pass over it. The horizontal orbital velocities may cause water to be pushed against the WEP, creating a substantially horizontal force by stopping the orbital velocities. The force applied to the WEP may then be transmitted by the panel supports which pivot at the base, thus providing the force that turns an electrical generator or hydraulic pump. In certain embodiments, the panel supports may be pivotably attached to a base or may be pivotably attached directly to a power extraction device, which may include without limitation an electrical generator or hydraulic pump. In certain embodiments, the panel supports may be operably connected to the power extraction device so that the electrical generator or hydraulic pump may be pushed or turned in one direction when the wave peak is passing the WEP, and may be pulled or rotated in the opposite direction when the wave trough passes. The direction of rotation may reciprocate once during the passage of each wave and return to the original direction for the next wave. Generator power collection control circuitry may be configured to create uniform output power that may be sent to the on-shore power grid.

In certain embodiments, the power output from WEPs may be increased by arranging multiple energy absorbing panels in a first row with space between the adjacent panels so that vorticity due to the impinging orbital velocities may be permitted to move freely around the vertical edges of the panel. In certain embodiments, additional panels may be arranged in a second row where they are positioned so that the panels are centered in the space between the panels in the first row. The panels may include a flexible membrane that permits the shape of the panel to reverse in response to the reciprocating orbital velocity. In certain embodiments, the concave shape of the flexible membrane may increase the drag on the side of the panel that the orbital velocities are impinging on while reducing the drag of the opposite side of the membrane that is being pushed through the water. When the wave orbital velocities reverse, the shape of the membrane also may reverse. The reversing shape may maximize the energy recovered from the wave by the reciprocating WEP.

In certain embodiments, the WEP may be placed in a location where resting the WEP on the sea floor may not be desirable. For these installations flotation may incorporated into the base of the WEP to cause the assembly to be positively buoyant. In certain embodiments, the WEP with attached floatation may be moored to the sea floor. In certain embodiments, the WEP may be prevented from rotating from the torque developed to drive the power extraction device by creating a pendulum either by attaching a counterweight or an anti-rotation sail to the WEP.

In certain embodiments, the orbital velocities may be the strongest at the surface and decay to near zero at a depth equal to one-half of the wavelength. Certain embodiments may permit adjustment of the vertical position of the WEP in response to changes in water depth and wave amplitude to maximize the energy recovered from the wave. In certain embodiments, vertical adjustment can be used to lower the WEP below the water surface where the wave orbital velocities are reduced to control the maximum power produced when the wave amplitude exceeds design conditions. In certain embodiments, if the water depth is one-half the wavelength, the height of the WEP is one-quarter the wavelength, and the WEP is lowered to the sea bottom, the energy applied to the WEP by the waves may be approximately one-third of the force that would have been applied if the WEP were designed to be position just below the water surface. In certain embodiments, vertical adjustment may protect the WEP from storm damage by limiting the forces applied by larger than normal waves.

In certain embodiments, the applied forces may be reduced even further by rotating the panel supports from a near vertical position to a horizontal position. In certain embodiments, when horizontal the force applied to the WEP due to waves may be reduced to nearly zero to protect the WEP and power extraction device from an overload during extreme sea conditions. In certain embodiments, rotating the panel supports from a near vertical position to a horizontal position may be used to turn the WEP "on" or "off" to control whether energy from the waves is absorbed or not.

In certain embodiments, the WEP may incorporate a wave energy absorbing panel comprised of a flexible material supported on opposite edges by panel supports that may be pivotably connected to a WEP base secured to the seafloor. The reciprocating wave action may cause the energy absorbing panel and the panel supports to pivot on the base which may transfer the force of the alternating horizontal components of wave orbital velocities impinging on the panel to suitable power generating components, such as an electrical generator or a hydraulic system, mounted to the base. In certain embodiments, the panel support may be pivotably connected directly to the power extraction device to transfer power. These embodiments may absorb power from a wave when the panel is travelling toward the shore or away from the shore. In certain embodiments, the system may dramatically reduce the material required for the construction and installation of a wave energy converter, thereby resulting in a cost that is competitive with traditional non-renewable energy power generators.

In certain embodiments, the efficiency of the WEP may be dependent on maximizing the capture of the ocean wave kinetic energy while minimizing the energy lost due to the WEP being pushed through water. Power may be absorbed when a force is applied to the energy absorbing panel and the energy absorbing panel moves in the same direction at a velocity that is less than the horizontal orbital velocity. If the energy absorbing panel did not move, that is the velocity was zero, the force on the energy absorbing panel would be maximized but the power absorbed would be zero. Inversely, if the energy absorbing panel moved at the same velocity as the horizontal orbital velocity, the force on the energy absorbing panel would be zero, and the power absorbed would also be zero. In certain embodiments, the velocity, and the power absorbed, of the energy absorbing panel may be controlled by the amount of power removed from the power generating components. The horizontal orbital velocity generates a force in the same direction on the impinging side of the energy absorbing panel while the velocity that the energy absorbing panel is being pushed through the water generates an opposing force on the opposite side of the energy absorbing panel. In certain embodiments, the efficiency of the WEP may be increased when the force absorbed from the horizontal orbital velocity is maximized while the force to push the WEP though water is minimized.

In certain embodiments, the WEP may capture the kinetic energy in a wave by bringing the horizontal component of the orbital velocity to a stop on the wave energy absorbing panel. Stopping the horizontal components of the orbital velocity may create pressure on the surface of the wave energy absorbing panel. The pressure, typically referred to as dynamic pressure, is expressed as:

$$P_d = \frac{\rho * V^{\wedge 2}}{2}$$

Where:
$P_d$=Dynamic Pressure (kg/(m*sec^2)
$\rho$=Density of water (kg/m3)
V=Velocity (m/sec)

The force applied to the wave energy absorbing panel due to the horizontal components of the orbital velocity may be expressed as:

F=Ca*Pd*A

Where:
F=Force (kg)
Ca=Drag coefficient (dimensionless)
Pa=Dynamic Pressure (kg/(m*sec^2)
A=Area (m^2)

The drag coefficient varies depending on the shape of the surface or body immersed in the velocity field. Laboratory measurements of the drag coefficients for 2-dimensional shapes compiled by Hoerner ("Fluid-Dynamic Drag", 1965, page 3-17), are reproduced in FIG. 1A. The shapes shown in FIG. 1A represent 2-dimensional shapes or cross section cuts through the body, wherein the fluid velocity is moving toward the right and the drag coefficient of the various shapes is listed in the right-hand column of FIG. 1A. It should be noted that the velocity impacting a concave shape 10 with a constant radius generates the largest drag coefficient of 2.30. The drag coefficient for the inverse of the concave shape 20, the convex shape, with a constant radius is 1.20.

In certain embodiments, the WEP combines the concave shape 10 with the high drag coefficient to absorb the energy from the horizontal orbital velocity to maximize the force applied to the WEP while pushing the convex shape 20 with the lower drag coefficient, through the water, to minimize the force lost pushing water out of the way.

In certain embodiments an energy absorbing panel includes a flexible membrane supported along two opposing edges to permit the shape of the energy absorbing panel to reverse with the orbital velocities. In certain embodiments, the force of the horizontal orbital velocity pushing on the energy absorbing panel results in a concave surface on the side being impacted and a convex surface on the opposite side so that the convex surface is pushed through the water ahead of the energy absorbing panel. When the horizontal orbital velocity reverses and pushes on what was the convex side of the energy absorbing panel, the shape of the flexible membrane may invert so that the concave surface flips to the opposite side. The energy absorbing panel may continually align the side of the energy absorbing panel with the highest drag coefficient with the impacting horizontal orbital velocity, thereby absorbing the most energy from the wave and as a result producing the most power. Similarly, the lowest drag coefficient may align with the side of the energy absorbing panel being pushed through the water, thereby minimizing the power lost by being pushed through the water.

In certain embodiments, when the horizontal orbital velocity reverses direction and begins to push on the convex side of the energy absorbing panel, the force of the horizontal orbital velocity may be used to reverse the shape of the panel, and not to transfer the force to the panel supports. As a result, there may be no power generated while the energy absorbing panel is changing shape. If the radius of curvature of the energy absorbing panel were equal to or greater than one-half of the wave orbital diameter, all of the horizontal orbital velocity would be used to change the shape, resulting in no power generated. In certain embodiments, this loss of wave energy may be minimized by limiting the distance that the energy absorbing panel moves to reverse the shape. In certain embodiments, for a situs with a design wave height of 3 m, the distance that the energy absorbing panel moves when changing shape would be twice the radius of curvature of the energy absorbing panel. In certain embodiments, using an energy absorbing panel with a radius of curvature of 0.15 m, that is 1/20 th of the wave height, the energy absorbing panel will move 0.3 m or 10% of the orbital diameter when changing shape. While 10% may not be insignificant, it should be noted that the horizontal orbital velocity is generally sinusoidal, that is the velocity begins at zero, gradually increases to the maximum velocity and then gradually decreases. As a result, the amount of energy actually lost to changing the shape of the energy absorbing panel would be less than 10%.

In certain embodiments, the energy absorbing panel's bottom edge may be well above the sea floor at the situs; for example, if the mean depth at the situs is 15 m, the energy absorbing panel may be approximately 7.5 m tall, with the energy absorbing panel's bottom edge at a mean depth of about 7.5 m. In certain embodiments, the energy absorbing panel's horizontal upper edge may be aligned relative to a wave front to maximize the horizontal velocities impinging upon the energy absorbing panel. In certain embodiments, the energy absorbing panel's horizontal upper edge may be aligned to be substantially parallel to the wave front.

Certain embodiments may minimize the efficiency loss due to flexing or stretching of the components that transfer the force absorbed from the wave to the power generator to a small fraction of the loss suffered by conventional systems. Materials generally exhibit some deflection when a load is applied. In certain embodiments, a flexible membrane, such as the energy absorbing panel, may be made up of individual filaments woven into a membrane. Even though the filaments may be made of very strong materials such as carbon fiber or other suitable material, they will still stretch when tension is applied. The amount of elongation may be expressed as a percentage, e.g., 2-3%, of the length of the filament when the maximum load is applied along the filament. In certain embodiments, for an energy absorbing panel used with a radius of curvature of 0.15 m, the length of the filaments in the energy absorbing panel would be the radius of curvature of 0.15 m multiplied by the mathematical constant $\pi$ resulting in approximately 0.5 m. The elongation of the energy absorbing panel when the load of the horizontal orbital velocity is applied would be 3%*0.5 m=0.015 m, which is less than 1 inch. Compared to the orbital diameter of 3 m, the elongation of the energy absorbing panel may have a negligible impact on the efficiency of a wave energy extraction system. Conventional systems may utilize a combination of large sails (7.5 m high X 30 m wide) and long suspension lines (50 m) to capture wave energy. These would also elongate 3 % of the length. The suspension line elongation of 1.5 m would severely reduce the efficiency of the device.

Figure 1B:
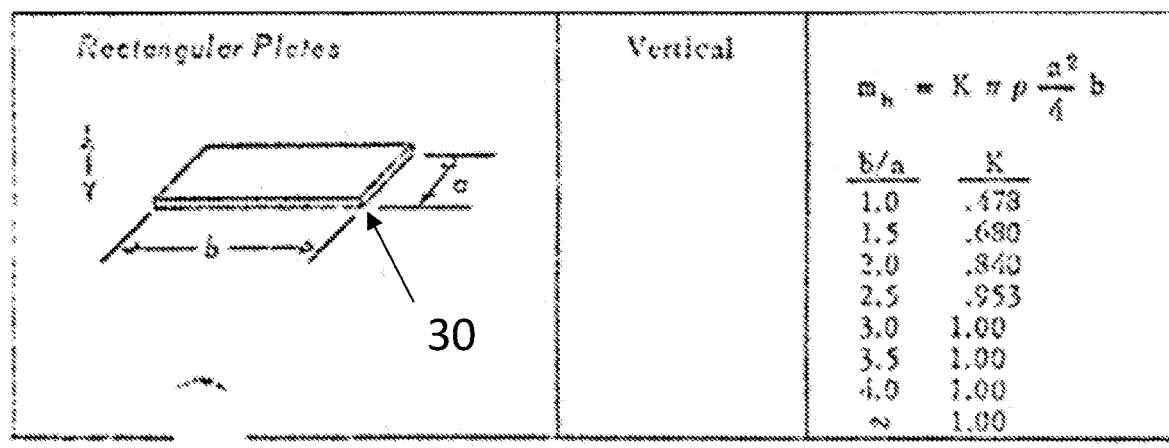
FIG. 1B is the geometry and equation used to estimate of the added mass of a rectangular plate.

Certain embodiments may limit the efficiency loss due to moving water from in front of the energy absorbing panel by adding an equivalent mass to the panel which increases the force needed to push it through the water, thereby reducing the velocity of the panel and the power transferred to the generator. The added mass of a rectangular plate 30 may be estimated according Brennen ("A Review of Added Mass and Fluid Inertial Forces", 1982, page 37), as shown in FIG. 1B.

$$m_h = K\pi\rho\frac{a^2}{4}b$$

Where:
$m_h$=Added mass (kg)
K=Constant depending on geometry (refer to FIG. 1B)
r =Density of water (kg/m3)
a =Narrow dimension of rectangle (m)
b =Long dimension of rectangle (m)

In certain embodiments, the added mass of the energy absorbing panel would be 530 kg for an exemplary 0.3 m wide X 7.5 m ft high WEP. For a conventional application (30 m wide X 7.5 m high), the added mass would be 1,322,700 kg. It should be recognized that the effective width of the wave front for the single energy absorbing panel is 0.3 m for the above embodiment and 30 m for the exemplary conventional system. 50 energy absorbing panels arranged in a row parallel to the wave front would result in a comparable effective width. The added mass of 50 energy absorbing panels would be 26,450 kg. The added mass of the exemplary conventional system is approximately 50 times certain embodiments disclosed herein. As a result, certain embodiments may be able to accelerate in response to the horizontal orbital velocity, absorb energy and transmit it with high efficiency. Conversely, the exemplary conventional system uses most of its absorbed energy to move water with a severe loss of efficiency.

In certain embodiments, a wave energy extraction system is disclosed, comprising: a wave energy panel, comprising: a first support member; a second support member spaced a fixed distance apart from the first support member; a flexible membrane extending between the first support member and the second support member and having a radius that is less than 25% of a maximum wave height; wherein the flexible membrane is configured to be pushed into a concave shape by a first horizontal wave velocity in a forward direction and into a reverse concave shape by a second horizontal wave velocity in a reverse direction opposite to the forward direction causing the wave energy panel to pivotably reciprocate between a first position and a second position; and a power extraction device operably connected to the wave energy panel so that the reciprocation of the wave energy panel in response to waves transfers power to the power extraction device. The first support member and the second support member may define a plane. The radius may be equal to one-half of the fixed distance. The wave energy panel may be configured to be aligned with a wave front to increase the power generation capability of the wave extraction system. The power extraction device may comprise at least one of a generator and a hydraulic pump. The hydraulic pump may be operably connected to a reverse osmosis system.

In certain embodiments, the wave energy extraction system may further comprise a plurality of wave energy panels. The plurality of wave energy panels may be arranged in a single row. The plurality of wave energy panels may be arranged in a plurality of staggered rows. The plurality of wave energy panels may be operably connected to a single power extraction device. The plurality of wave energy panels may be operably connected to a plurality of power extraction devices. The flexible membrane may be slidably attached to the first support member and the second support member to allow the flexible membrane to be raised and lowered in the wave energy panel to adjust the power generated by the wave energy extraction system. The wave energy extraction system may be configured to be attached to an ocean floor in shallow water. The wave energy extraction system may further comprise: a buoyant block attached to the wave energy panel; a counterweight attached below the buoyant block; and a plurality of mooring attachment points for mooring the wave energy extraction system to the ocean floor. The wave energy extraction system may further comprise: a buoyant block attached to the base; an anti-rotation sail attached below the buoyant block; and a plurality of mooring attachment points for mooring the wave energy extraction system to the ocean floor. The flexible membrane may further comprise an upper edge, a lower edge and a longitudinal axis; and the wave energy panel may further comprise rigid end caps located at the upper edge and the lower edge to reduce flow along the longitudinal axis. The flexible membrane may further comprise an upper edge, a lower edge and a longitudinal axis; and the wave energy panel may further comprise flexible end caps located at the upper edge and the lower edge to reduce flow along the longitudinal axis. The wave energy panel may be rotatable from vertical to horizontal to stop energy absorption to protect it from damage in extreme seas or during periods where it is not desired to remove wave energy.

In certain embodiments, a method of extracting wave energy is disclosed, comprising: providing a wave energy panel, comprising: a first support member; a second support member spaced a fixed distance apart from the first support member; a flexible membrane extending between a first support member and a second support member and having a radius that is less than 25% of a maximum wave height; applying a first horizontal wave velocity in a forward direction to push the flexible membrane into a concave shape and applying a second horizontal wave velocity in a reverse direction opposite to the forward direction to push the flexible membrane into a reverse concave shape, thereby causing the wave energy panel to pivotably reciprocate between a first position and a second position; and operably connecting a power extraction device to the wave energy panel so that the reciprocal motion of the wave energy panel in response to waves transfers power to the power extraction device. The first support member and the second support member may define a plane. The radius may be equal to one-half of the fixed distance. The method may further comprise aligning the wave energy panel with a wave front to increase the power generation capability of the wave energy panel. The method may further comprise attaching the wave energy panel to an ocean floor in shallow water. The method may further comprise rotating the wave energy panel from vertical to horizontal to stop energy absorption to protect it from damage in extreme seas or during periods where it is not desired to remove wave energy.

In certain embodiments, a wave energy extraction system, comprising: a wave energy panel, comprising: a first support member; a second support member spaced a fixed distance apart from the first support member; a flexible membrane extending between the first support member and the second support member and having a first surface and a second surface opposite the first surface; wherein the flexible membrane is configured to be pushed into a concave shape by a first horizontal wave velocity impinging on the first surface in a forward direction and into a reverse concave shape by a second horizontal wave velocity impinging on the second surface in a reverse direction opposite to the forward direction, causing the wave energy panel to pivotably reciprocate between a first position and a second position; and wherein the concave shape of the flexible membrane increases the drag coefficient on the first surface of the flexible membrane when it is impinged upon by the first horizontal velocity while reducing the drag coefficient of the second surface of the flexible membrane which is pushed through the water and the reverse concave shape of the flexible membrane increases the drag coefficient on the second surface of the flexible membrane when it is impinged upon by the second horizontal wave velocity while reducing the drag coefficient of the first surface of the flexible membrane which is pushed through the water, thereby increasing power generation of the wave energy panel in the forward and reverse directions during reciprocation; and a power extraction device operably connected to the wave energy panel so that the reciprocation of the wave energy panel in response to waves transfers power to the power extraction device. The first support member and the second support member may define a plane. For the concave shape, the drag coefficient of the second surface of the flexible membrane may be less than 60% of the drag coefficient of the first surface of the flexible membrane. For the reverse concave shape, the drag coefficient of the first surface of the flexible membrane may be less than 60% of the drag coefficient of the second surface of the flexible membrane. The flexible membrane may have a radius that is less than 25% of a maximum wave height. The radius may be equal to one-half of the fixed distance.

Figure 1C:
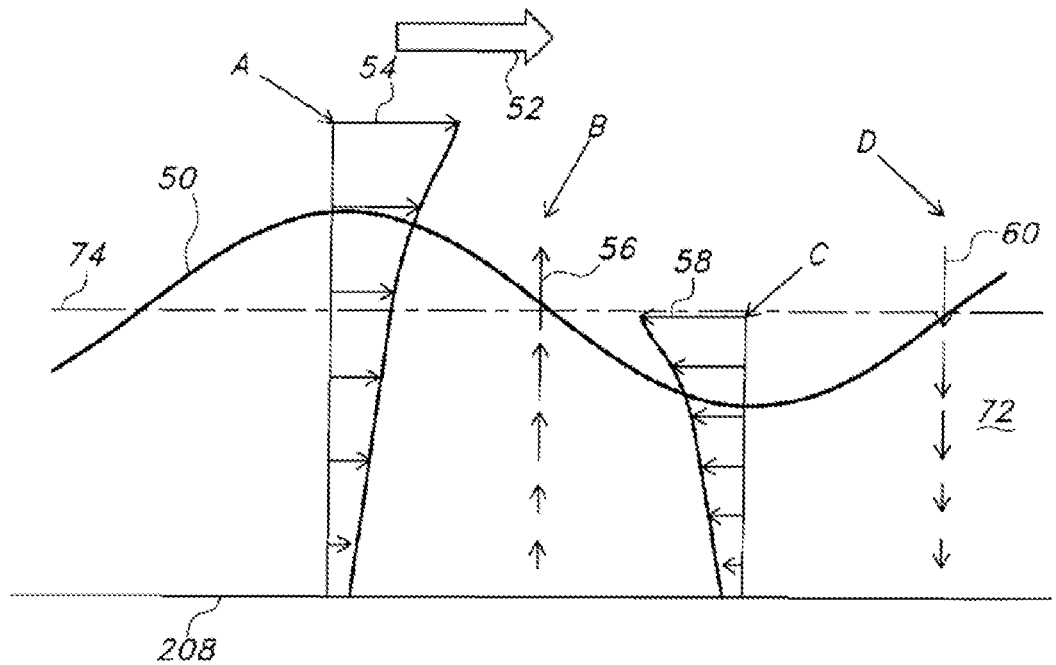
FIG. 1C and FIG. 1D are diagrams representing a vertical cross section of a body of water, such as an area within an ocean, showing the ocean's surface and waves and illustrating known relationships among sub-surface orbital velocity, wave position, and water depth.

In certain embodiments, illustrated in FIGS. 1-15, the surface of a single wave may be broadly described mathematically as a sinusoidal motion. It can be observed from the motion of the water that there are both vertical and horizontal vector components of velocity in a wave. The vertical component of velocity causes the wave to rise above and to fall below a mean waterline, while the horizontal component of wave velocity causes the wave crest to move in the direction of the wave propagation. It is less obvious that there is also a horizontal component of velocity opposite to the direction of wave propagation. In certain embodiments, FIG. 1C shows velocities at four points, A. B, C and D, along a sinusoidal wave 50 having a direction of propagation 52, where the velocities are either horizontal or vertical, as indicated by vector arrows 54, 56, 58 and 60 at the respective points.

Figure 1D:
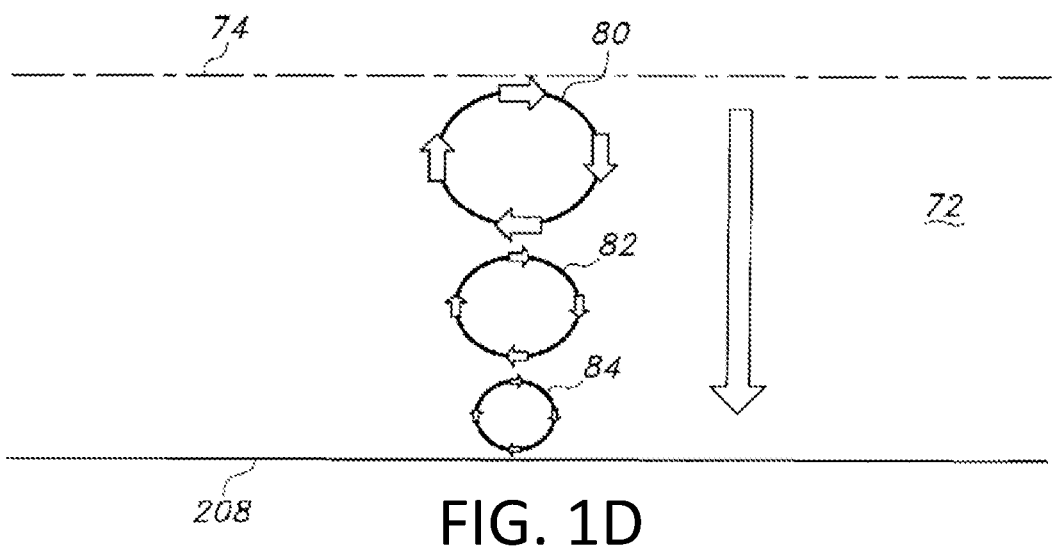

In certain embodiments shown in FIG. 1A, the magnitude of the wave velocity at various depths may be represented by the length of the vector arrows. At the point of maximum wave amplitude, referred to as the wave peak, indicated as Point A. the velocity vectors are horizontal in the direction of the wave propagation, as indicated by arrows 54. Moving forward from the wave peak A to the point where the wave 50 passes through the mean water line level 74 at point B. the velocity vectors change to a vertically upward direction, indicated by arrows 56. At the point of minimum wave amplitude, referred to as the wave trough, indicated as Point C, the velocity vectors are horizontal in the direction opposite to the wave propagation, as indicated by arrows 58. As the wave 50 returns to the mean water line, the velocity vectors change to vertically downward, indicated by arrows 60 at Point D. The combination of these velocity vectors creates circular velocity vectors such as orbital flows 80, 82 and 84 (at different depths), as shown in FIG. 1D, which may be referred to as the orbital velocity of the wave.

In deep water, the energy of the wave is split between potential energy, incorporated in the rise and fall of the water surface as indicated by the sinusoidal waveform 50, and kinetic energy, which is the motion of the water 72 parallel to the direction 52 of wave propagation. The orbital velocity 80 is strongest at the surface and decays with depth, as indicated by the vector arrows 54, 56, 58 and 60 and the diagrams 82 and 84, reaching zero at a depth of approximately one-half the wavelength, as indicated. In shallow water, where the water depth is less than one-half the wavelength, the orbital velocities extend down to the sea bottom. As the water depth becomes shallower than one-half of the wavelength, the orbital velocity paths are compressed in the vertical direction, which flattens the path into an oval.

Referring now to FIGS. 2-15, where like characters designate like or corresponding parts elements or components throughout the several views, in the following description specific details are given to provide a thorough understanding of certain embodiments. Various features and advantages are described below with reference to certain embodiments and variations thereof. However, it will be understood by one of ordinary skill in the art that alternative embodiments of the structures and methods illustrated herein may be employed without departing from the scope and principles of the described invention.

Figure 2:
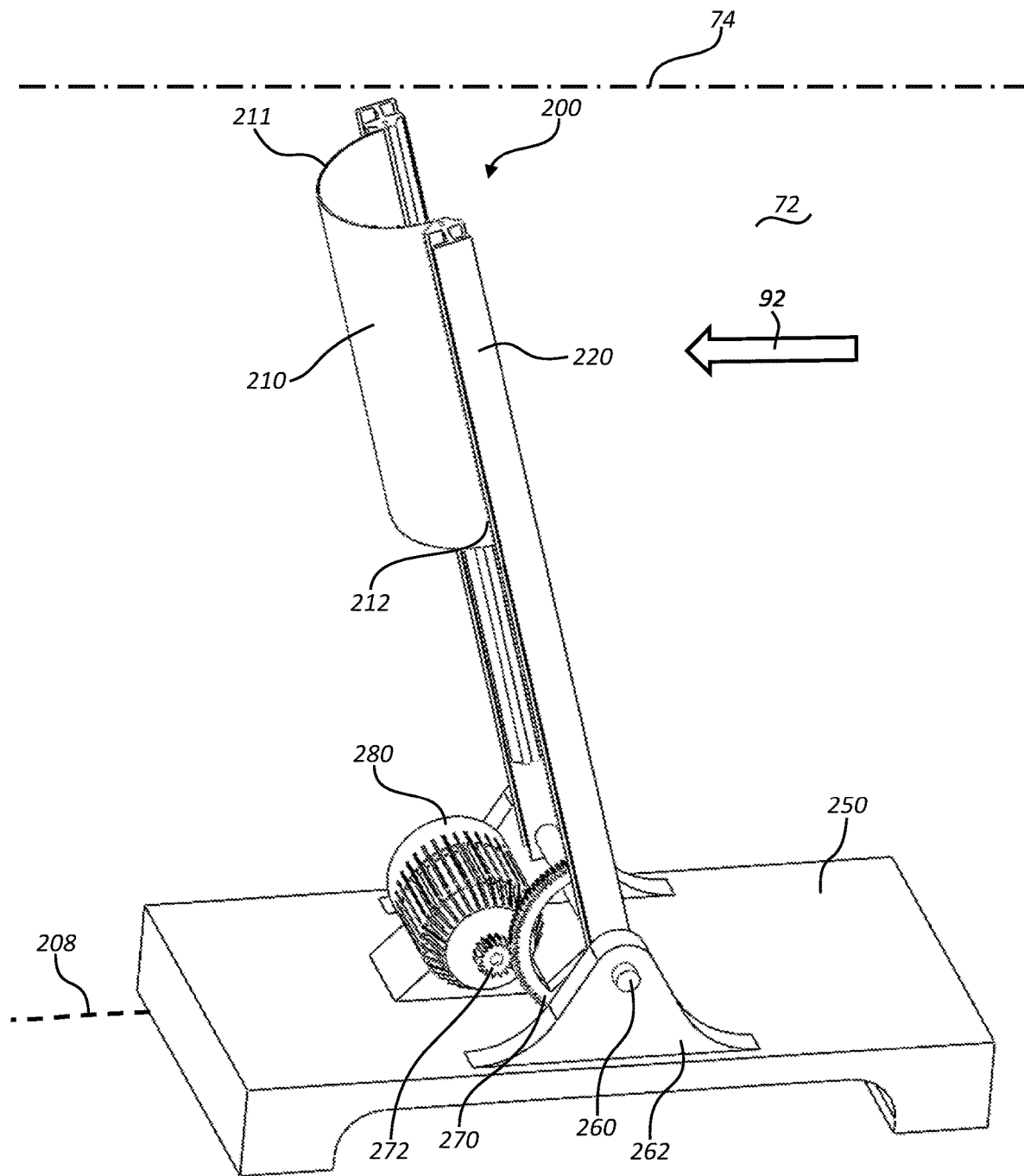
FIG. 2 illustrates an isometric view of a wave energy panel connected to an energy converter assembly, in accordance with certain embodiments.

In certain embodiments as shown in FIG. 2, an ocean wave energy converter referred to as a wave energy panel (WEP) system 200 may include an energy absorbing panel 210 that may comprise a flexible panel submerged in the ocean 72 at a desired situs, with an upper edge 211 that may be located near the surface of the water and may be located at or near the mean water line 74 and a bottom edge 212 which may extend vertically downwardly to a selected depth at the selected situs. If near shore, the horizontal upper edge 211 of the panel 210 may be aligned to be substantially parallel to the shoreline (not shown). The energy absorbing panel 210 may have a generally concave shape in the horizontal plane. In certain embodiments illustrated in FIG. 2, for an installation near shore, with a situs mean depth of 15 m between the mean water line 74 and the ocean bottom 208, the vertical extent or height of panel 210 may be extend about 7.5 m and its width (in the direction parallel to the shoreline) may be about 10% of the design wave amplitude. For a 3 m wave amplitude, this may correspond to a panel width of about 0.3 m wide which results in a radius of the concave shape of 0.15 m. Each vertical edge of the energy absorbing panel 210 may be attached to a panel support 220 that may support the panel and may transmit the force absorbed by the panel to a generator 280 that may convert the force into usable power. The generator 280 may be mounted to WEP base 250. The panel supports 220 may be connected to an axle 260 which may be supported by bearings in housings 262 that may also be mounted on the base 250. The panel vertical supports 220 may pivot on the axle 260 when the wave energy panel 200 is impacted by the wave orbital velocity 92. The panel vertical supports 220 may transfer the force absorbed by the energy absorbing panel 210 to the electric generator 280 through a linkage such as a gear 270 which may engage a gear 272 on the electric generator 280. The base 250 may be secured to the sea floor 208 by means appropriate for the type of materials at the situs that will fix the position and orientation.

Figure 3B:
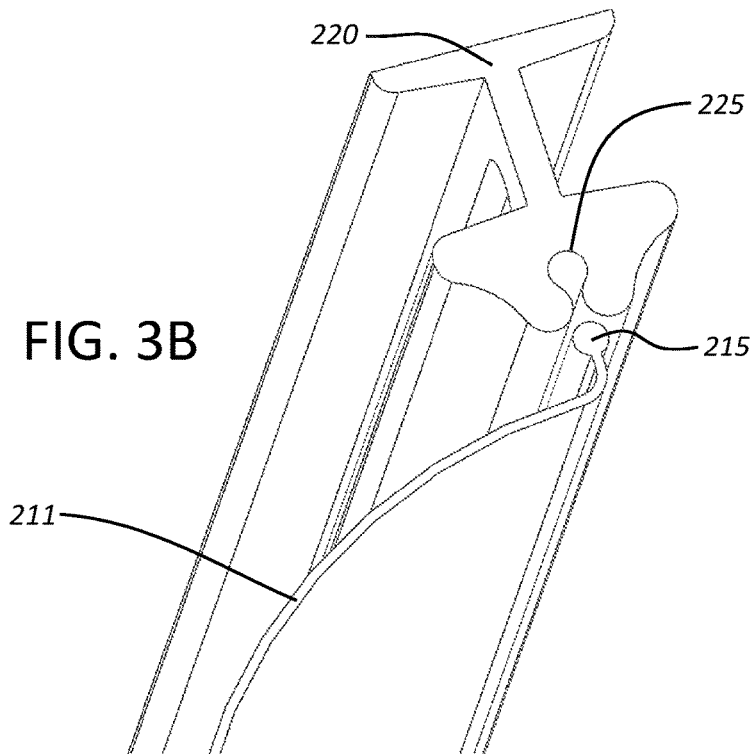
FIG. 3B illustrates an exploded view of a panel support engagement with a bolt rope of the energy absorbing panel in accordance with certain embodiments.
Figure 3A:
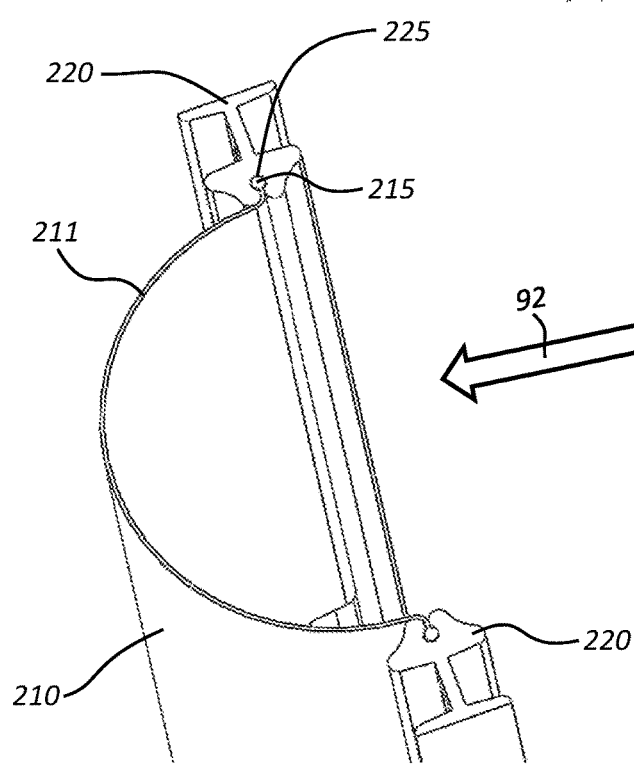
FIG. 3A illustrates an enlarged, detailed view of a panel support engagement with a bolt rope of an energy absorbing panel in accordance with certain embodiments.

In certain embodiments, FIG. 3A illustrates the top of the panel vertical supports 220 which may include a specially constructed groove, referred to as a bolt rope track 225. Similarly, the energy absorbing panel 210 may have a matching shape, referred to as a bolt rope 215, along the two edges that may engage with the bolt rope track 225. When the bolt rope 215 is inserted into the bolt rope track 225, the energy absorbing panel 210 may be moved along the longitudinal axis of the panel vertical support 220 however, the energy absorbing panel 210 may not be pulled out of the bolt rope track perpendicular to the panel vertical support 220. In certain embodiments, FIG. 3B illustrates an exploded view of the bolt rope track 225 and the bolt rope 215.

Figure 4:
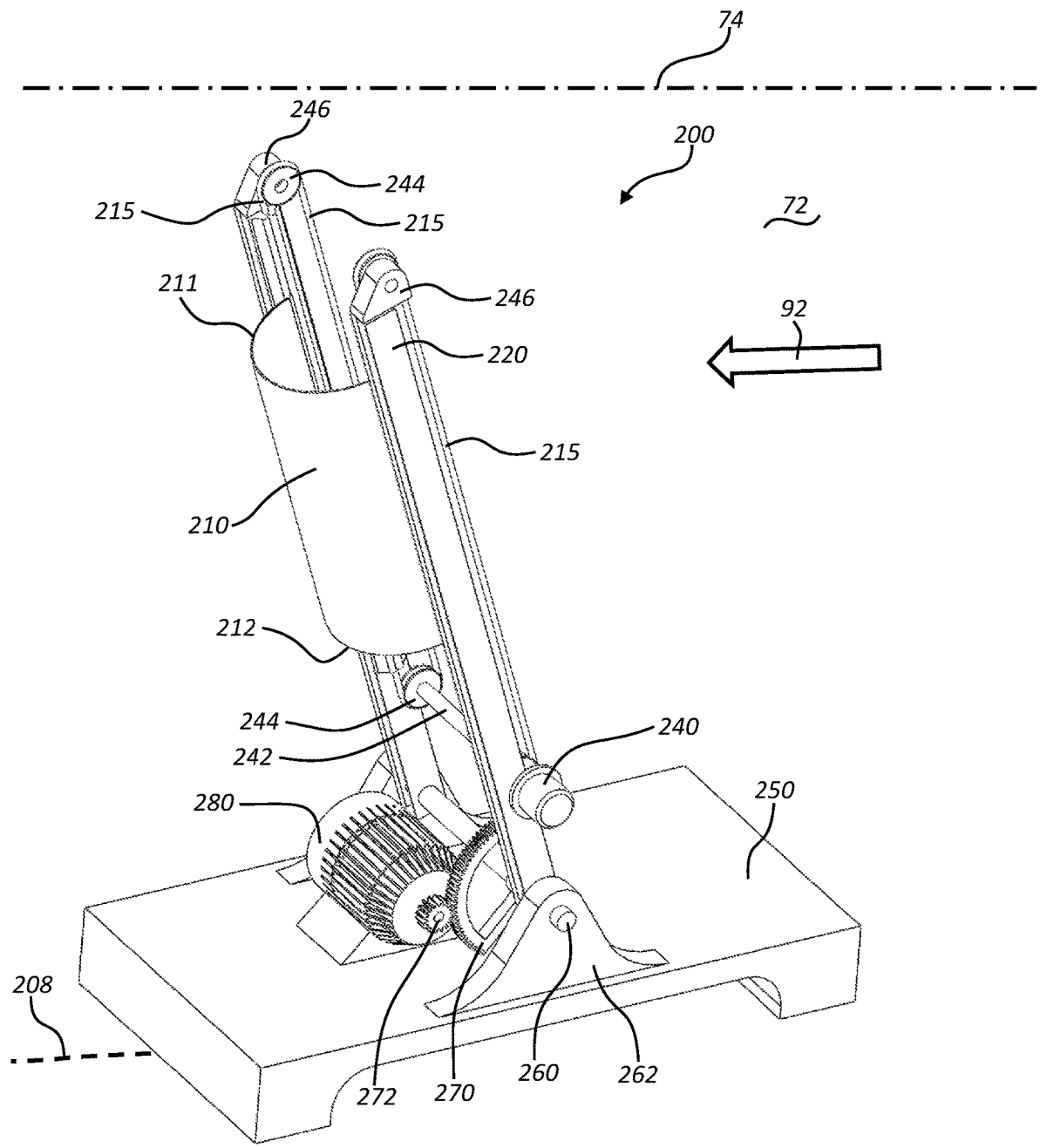
FIG. 4 illustrates an isometric view of a wave energy panel configuration with features to raise and lower the energy absorbing panel in accordance with certain embodiments.

In certain embodiments, FIG. 4 illustrates an ocean wave energy converting panel system 200 with the panel 210 lowered below the surface of the water 74. In certain embodiments, lowering the energy absorbing panel 210 away from the water surface moves the energy absorbing panel 210 into a region where the wave orbital velocity 92 that impact the panel are lower, which reduces the forces applied to the energy absorbing panel 210. The energy absorbing panel 210 may be lowered by pulling the bolt rope 215 that is attached to the bottom of energy absorbing panel 210 downward. The opposite end of the bolt rope 215 may be attached to the top of the energy absorbing panel 210 forming a continuous loop. The position of the panel bolt rope 215 may be controlled by energizing the drive motor 240 which turns the common axle 242 that connects pulleys 244 on either side of the energy absorbing panel 210. An additional pair of pulleys 244 may be located at the end of the panel support 220. The pulleys 244 may be supported by bearings 246 that are fixed to the panel supports 220. The bolt rope 215 may pull the energy absorbing panel 210 either up or down, simply by controlling the direction of drive motor 240 rotation.

In certain embodiments, the shape of the energy absorbing panel 210 may reciprocate in response to the reversing horizontal component of the wave orbital velocities. In certain embodiments, FIG. 5A illustrates the shape of the energy absorbing panel 210 viewed from above when the horizontal orbital velocity moves in a first direction 92 toward the left side of the figure. The energy absorbing panel 210 may assume a concave shape to the right of the figure due to the force applied to the energy absorbing panel 210 by the horizontal velocity moving in a first direction 92 of the passing wave. The edges of the energy absorbing panel 210 may be constrained by the bolt rope 215 being engaged in the bolt rope track 225. In certain embodiments, FIG. 5B illustrates the shape of the energy absorbing panel 210 when the horizontal velocity begins to reverse direction. In FIG. 5B the horizontal velocity moving in a first direction 92 to the left side of FIG. 5A has decreased to zero which relieves the tension in the energy absorbing panel 210. In certain embodiments, the horizontal velocity may begin moving in a second direction 94 toward the right side of the figure and may distort the shape of the energy absorbing panel 210 by applying a force to the convex side of the panel illustrated in FIG. 5A. The horizontal velocity moving in a second direction 94 may continue to change the shape of the energy absorbing panel 210 until it has acquired a concave face toward the left side of the figure as illustrated in FIG. 5C. The shape of the energy absorbing panel 210 may reverse from facing left to facing right and the opposite, from facing right to facing left, for each passing wave. The energy absorbing panel 210 may be constructed of flexible material, for example rip stop nylon, multiple rigid strips joined along their edges, or a combination of rigid metal strips and flexible material so that the shape can reverse in response to the changing horizontal velocities.

Figure 6:
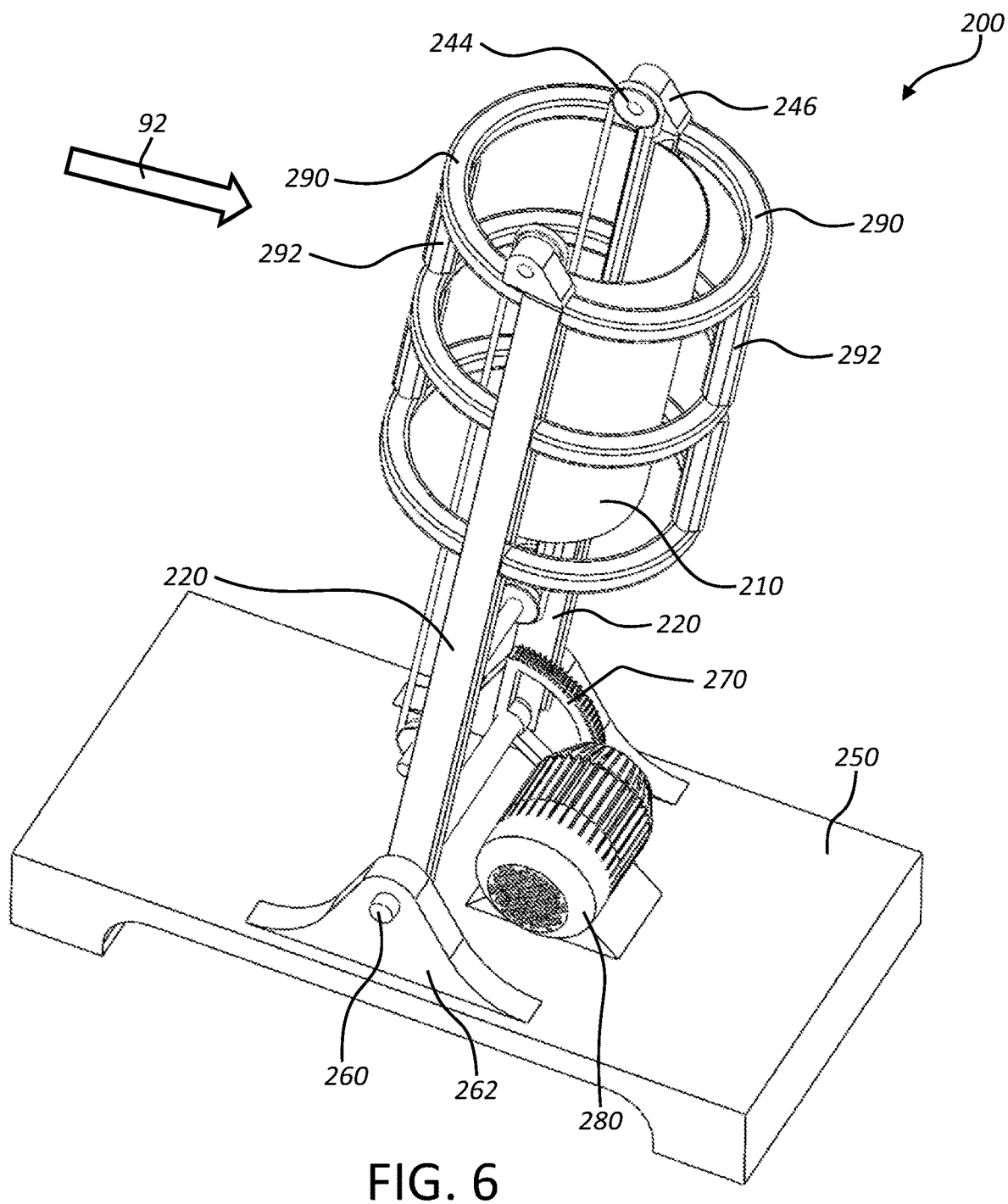
FIG. 6 illustrates additional structural components to maintain the alignment of panel supports in accordance with certain embodiments.

In certain embodiments, FIG. 6 illustrates additional structural elements that may be used to maintain the concave/convex shape of the energy absorbing panel 210 along its length by stiffening the panel vertical supports 220. Transverse stiffeners 290 may connect the two panel supports 220. Vertical supports 292 may be inserted between the transverse supports 290 to control the distortion of the transverse supports thereby permitting the use of thinner components. The additional structure, 290 and 292, may constrain the panel supports 220 to move together in a plane and to resist twisting. Sufficient clearance may be provided between the additional structure 290 and 292 and the energy absorbing panel 210 so that there may be sufficient clearance to avoid chaffing and wear of the energy absorbing panel 210.

Figure 7:
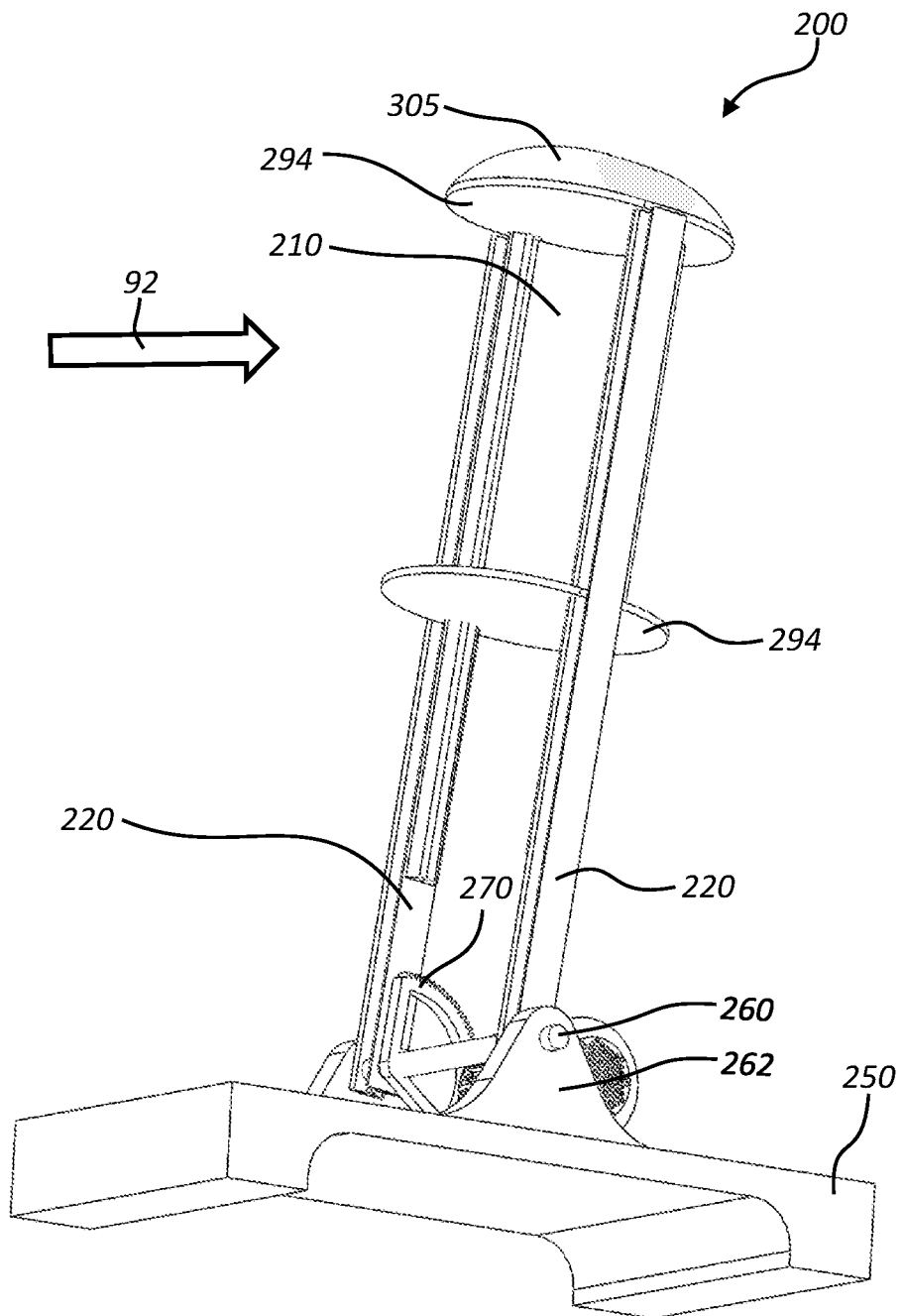
FIG. 7 illustrates an isometric view of a wave energy panel with rigid caps at either end of an energy absorbing panel in accordance with certain embodiments.

In certain embodiments, the efficiency of the WEP 200, defined as the amount of energy recovered from the wave divided by the energy contained in the wave, may be increased by reducing the flow of water from the top and bottom ends of the energy absorbing panel 210. Rigid end caps 294 may be added to the WEP 200, at both ends of the energy absorbing panel 210 as illustrated in FIG. 7. The stiffeners shown in FIG. 6 have been removed to aid visualization. It should be noted that the rigid end caps 294 and the energy absorbing panel 210 may be in close proximity or touching to reduce the flow, but may not create sufficient friction to prevent the shape of the energy absorbing panel 210 from reciprocating. The rigid end caps 294 may be attached to the panel supports 220 with or without the transverse stiffeners 290 and vertical stiffeners 292 depending on the design conditions at the situs. Buoyancy 305 may be added to provide a restoring force to return the WEP to a near vertical position after a wave passes for situs where the reversing horizontal orbital velocity does not return the WEP to a near vertical position.

In certain embodiments, the panel supports 220 may constrain the edges of the energy absorbing panel 210 and transfer the forces absorbed from the horizontal orbital velocity to the power generator 280. The panel supports 220 may act as structural members. The shape of the panel vertical supports 220 may create drag when impacted by the wave velocities and may result in a loss in efficiency. The drag imposed by the panel supports 220 may be reduced significantly by streamlining their shape. In certain embodiments, FIG. 8A is a side view of the upper half of the WEP 200 indicating where a cross section view A-A is made. FIG. 8B is a top view looking down on the section A-A cross section of FIG. 8A. The panel support 220 may include an I-beam shape that includes bolt rope track 225. The support fairing 230 may enclose the panel vertical support 220 in a streamlined shape. The shape of the support fairing 230 may be symmetrical to provide the same flow benefit whether the energy absorbing panel 210 is moving to the left or to the right. In certain embodiments, FIG. 8B illustrates the horizontal orbital velocity 92 coming from the left of the figure and the flow impacting the vertical support fairing 230 and splitting so that it can go to one side or the other. A panel fairing 234 may also reduce the losses of the horizontal orbital velocity impacting the center of the energy absorbing panel 210. The panel fairing 234 may split the flow toward one side or to the other, thereby reducing the losses that would occur. In certain embodiments, FIG. 8B also illustrates flow impacting the convex side of the energy absorbing panel, which represents the velocity 96 of the energy absorbing panel 210 being pushed through the water. Any drag on the convex side of the energy absorbing panel 210 may result in a reduction in the energy absorbed on the concave side. In certain embodiments, efficiency may be maximized to minimize any losses. The panel fairing 234 may split the flow toward one side or to the other. Support fairing vents 232 may be incorporated into the support fairing 230 to allow the flow to pass through the support fairing 230 and reduce the losses.

Figure 9B:
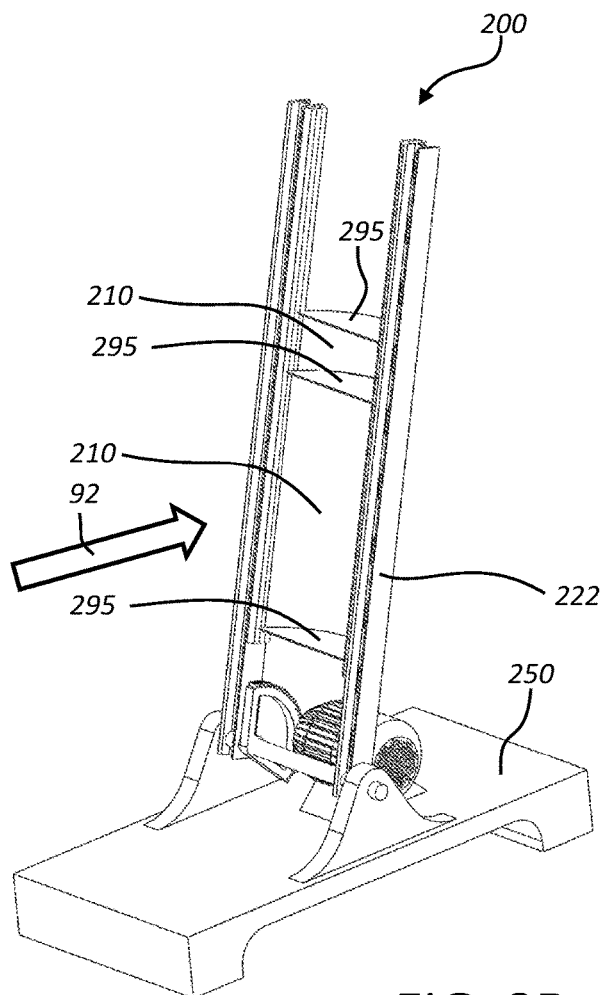
FIG. 9B illustrates an isometric view of multiple overlapping energy absorbing panels in accordance with certain embodiments.
Figure 9A:
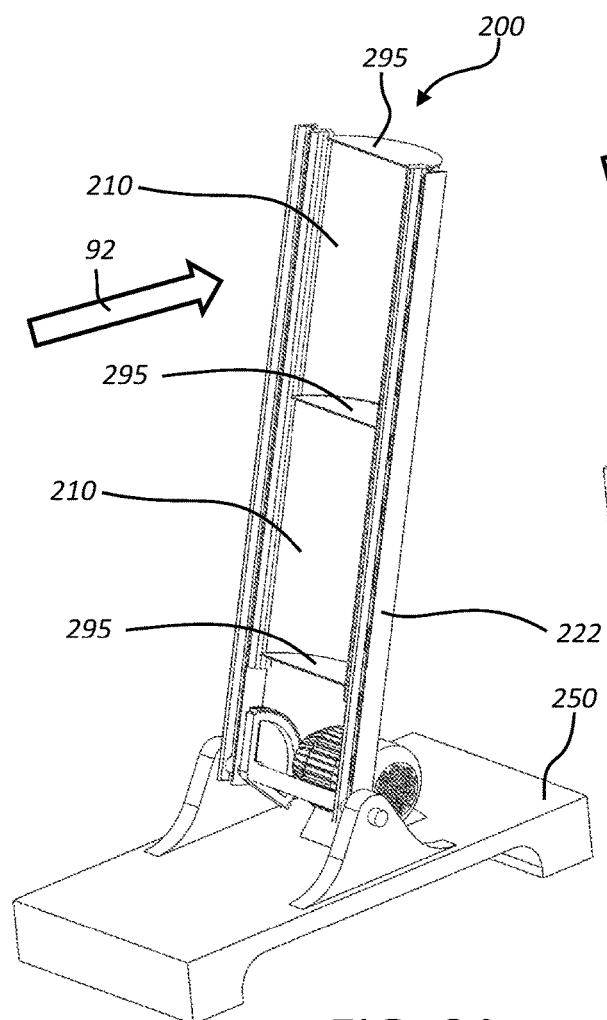
FIG. 9A illustrates an isometric view of a wave energy panel with multiple energy absorbing panels end to end in accordance with certain embodiments.

In certain embodiments, FIG. 9 shows a WEP 200, wherein two energy absorbing panels 210 may be positioned so that they are end-to-end as shown in FIG. 9A. Double bolt rope tracks 222 may be provided so that the two energy absorbing panels 210 can move past each other to reduce the amount of the surface area of the energy absorbing panel exposed to the horizontal orbital velocity 92. In certain embodiments, FIG. 9B shows the upper energy absorbing panel 210 may be moved down the double bolt rope track 222. The area of the upper energy absorbing panel 210 exposed to the horizontal orbital velocity may be reduced because the area is blocked by the lower energy absorbing panel 210. Controlling the exposed surface area of the energy absorbing panel 210 may permit control of the energy absorbed. This may provide the ability to control the energy absorbed and prevent damage when the wave intensity increases above the design conditions. Also illustrated in FIG. 9 are flexible end caps 295 that may be attached along their straight side to the bolt ropes 215 (FIG. 3B) which secure the energy absorbing panel 210 in the double bolt rope tracks 222 and at the centerline of the energy absorbing panel 210. The flexibility of the end cap 295 may permit the flexible end cap 295 to roll and flip over when the shape of the energy absorbing panel reverses.

Figure 10:
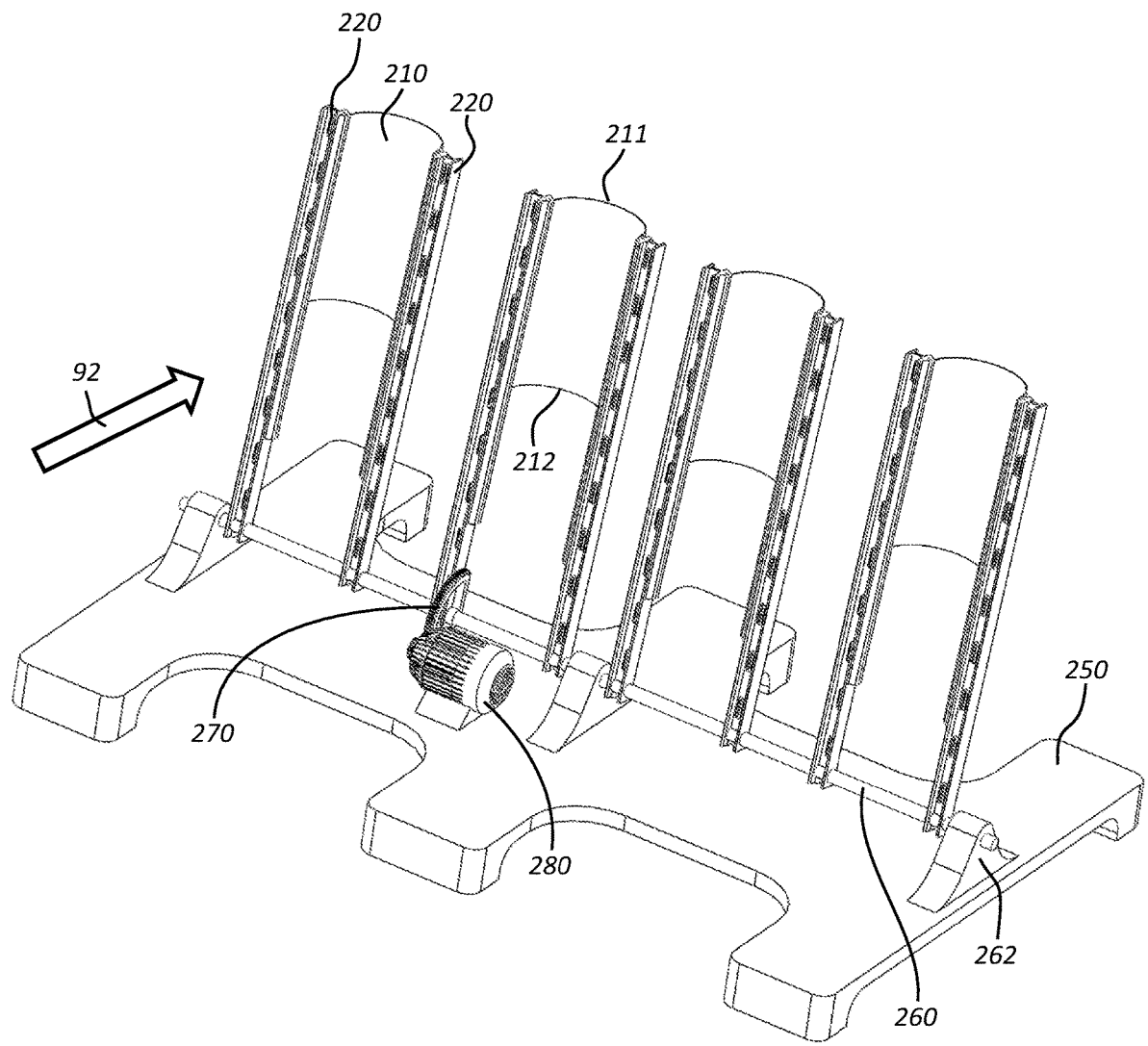
FIG. 10 illustrates an isometric view of multiple wave energy panels connected to a common generator, in accordance with certain embodiments.

In certain embodiments, FIG. 10 illustrates a series of energy absorbing panels 210 in a single row mounted to a common base 250. The energy absorbed from each energy absorbing panel may be transferred to the panel support 220 to a common axle 260 and then to a common generator 280. There may be a space between adjacent energy absorbing panels 210 due to the high drag coefficient achieved by the concave shape facing the horizontal orbital velocity 92. The number of energy absorbing panels 210 connected in this way may depend on the characteristics of the situs; and may include more panels when the wave front is long and uniform, and may include fewer panels when the wave front is shorter and disorganized. In certain embodiments, the energy absorbing panels 210 may be aligned relative to a wave front to maximize the horizontal velocities that impinge on the energy absorbing panels 210 to increase the power generation capability of the wave extraction system. In certain embodiments, the energy absorbing panels 210 may be aligned to be substantially parallel to a wave front to the extent possible over the span of the multiple energy absorbing panels.

Figure 11:
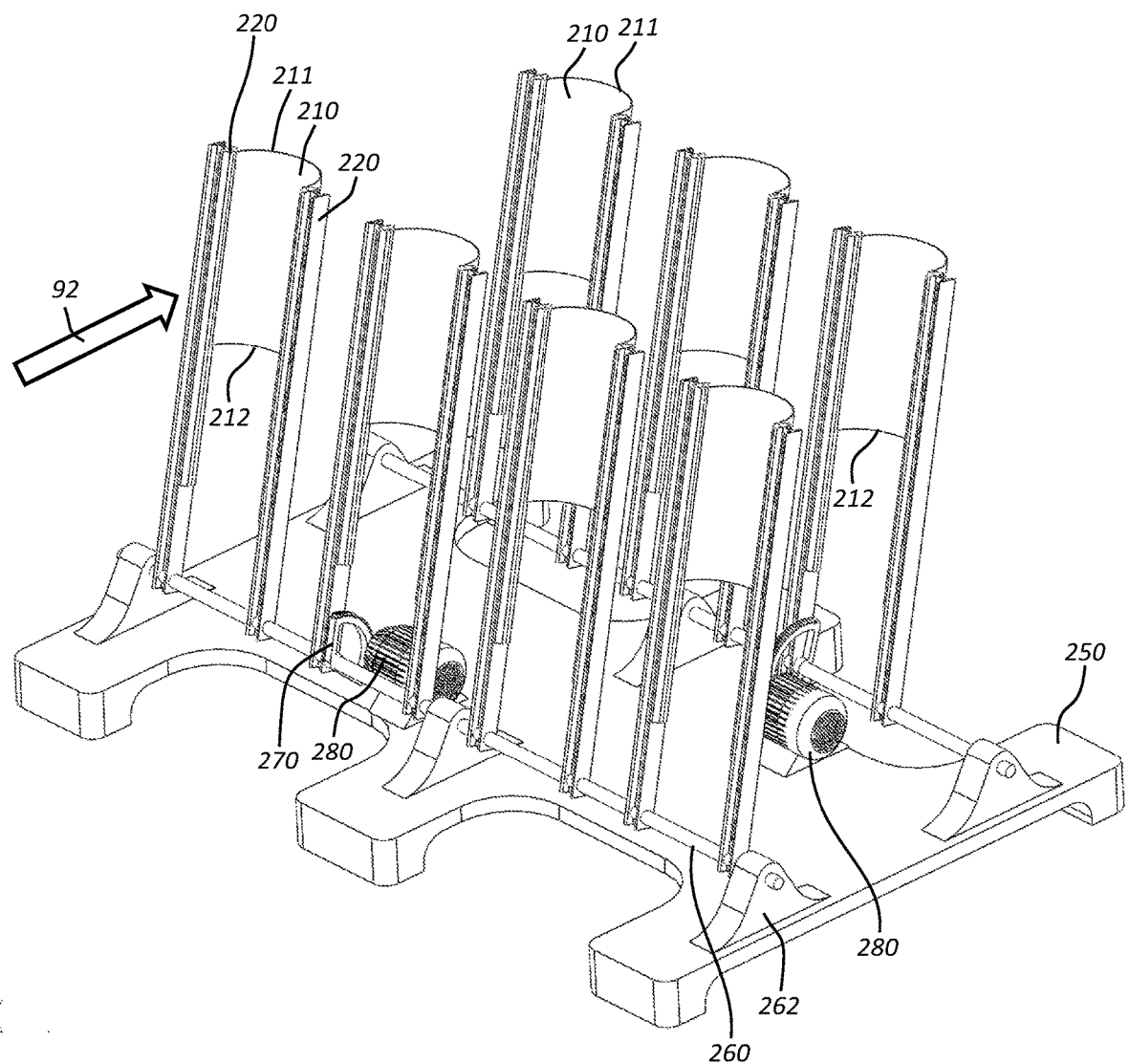
FIG. 11 illustrates an isometric view of multiple rows of wave energy panels connected to individual generators, in accordance with certain embodiments.

In certain embodiments, FIG. 11 illustrates two rows of energy absorbing panels 210 with each row attached to a separate axle 260 and a separate common generator 280. Each of the energy absorbing panels 210 may have a flexible membrane 210 with an upper edge 211, and a lower edge 212. The second row may be aligned with the spaces between the energy absorbing panels in the first row, allowing the second row to absorb energy from the horizontal orbital velocity 92 that passes between the adjacent energy absorbing panels 210 in the first row and from the vorticity that is pushed out of the concave shape of the energy absorbing panel 210 by the horizontal orbital velocity 92 impacting the first row. In certain embodiments, the rows of energy absorbing panels 210 may be aligned relative to a wave front to maximize the horizontal velocities that impinge on the energy absorbing panels 210 to increase the power generation capability of the wave extraction system. In certain embodiments, the energy absorbing panels 210 may be aligned to be substantially parallel to a wave front to the extent possible over the span of the multiple energy absorbing panels.

Figure 12:
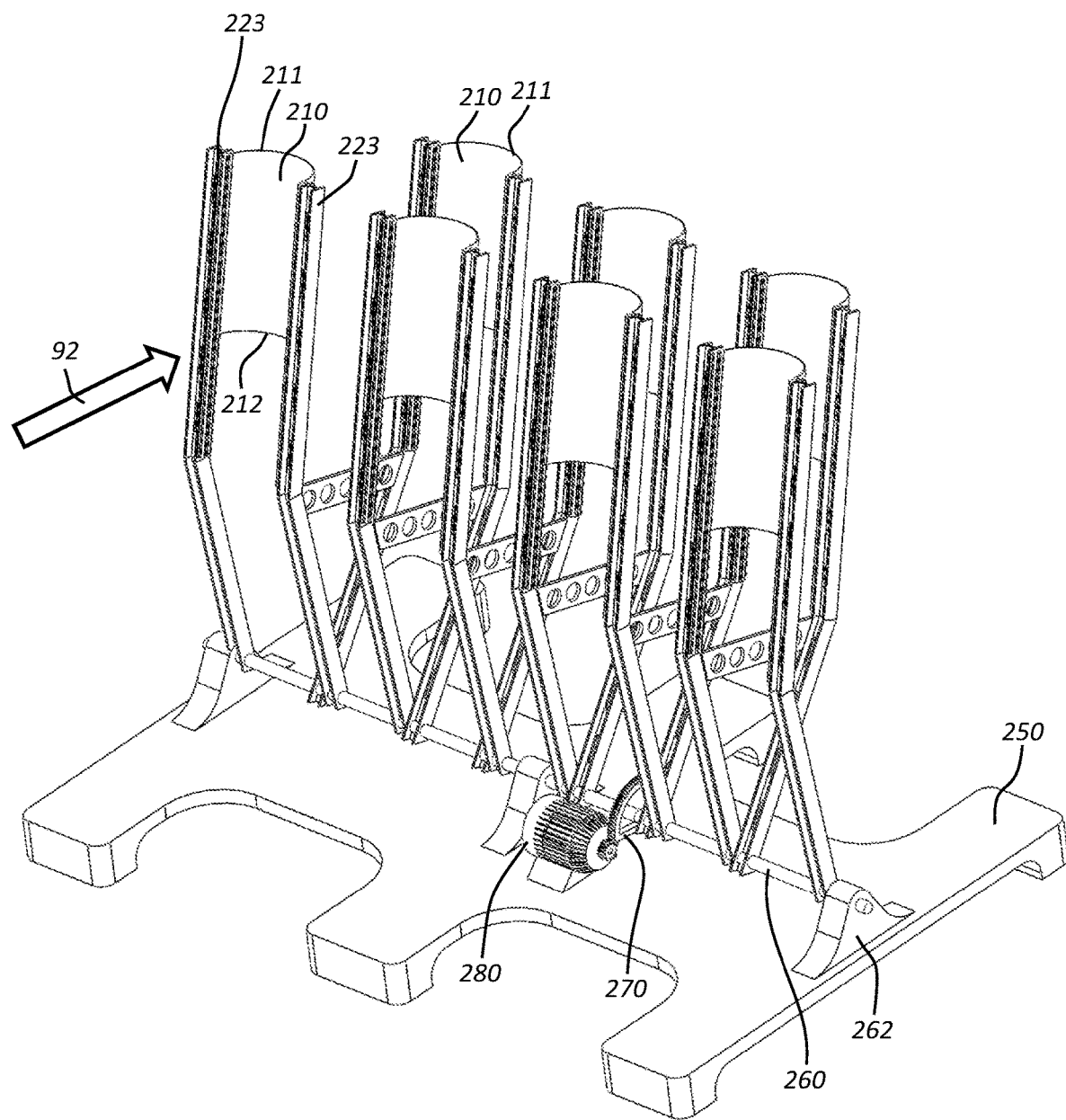
FIG. 12 illustrates an isometric view of multiple rows of wave energy panels connected to a common generator, in accordance with certain embodiments.

In certain embodiments, FIG. 12 illustrates two rows of energy absorbing panels 210 with both rows connected to the same axle 260 and generator 280. Flexible membrane 210 may extend between panel supports 223. Connecting the generator 280 to additional energy absorbing panels 210 may reduce equipment and cost when the conditions at the situs are favorable.

Figure 13:
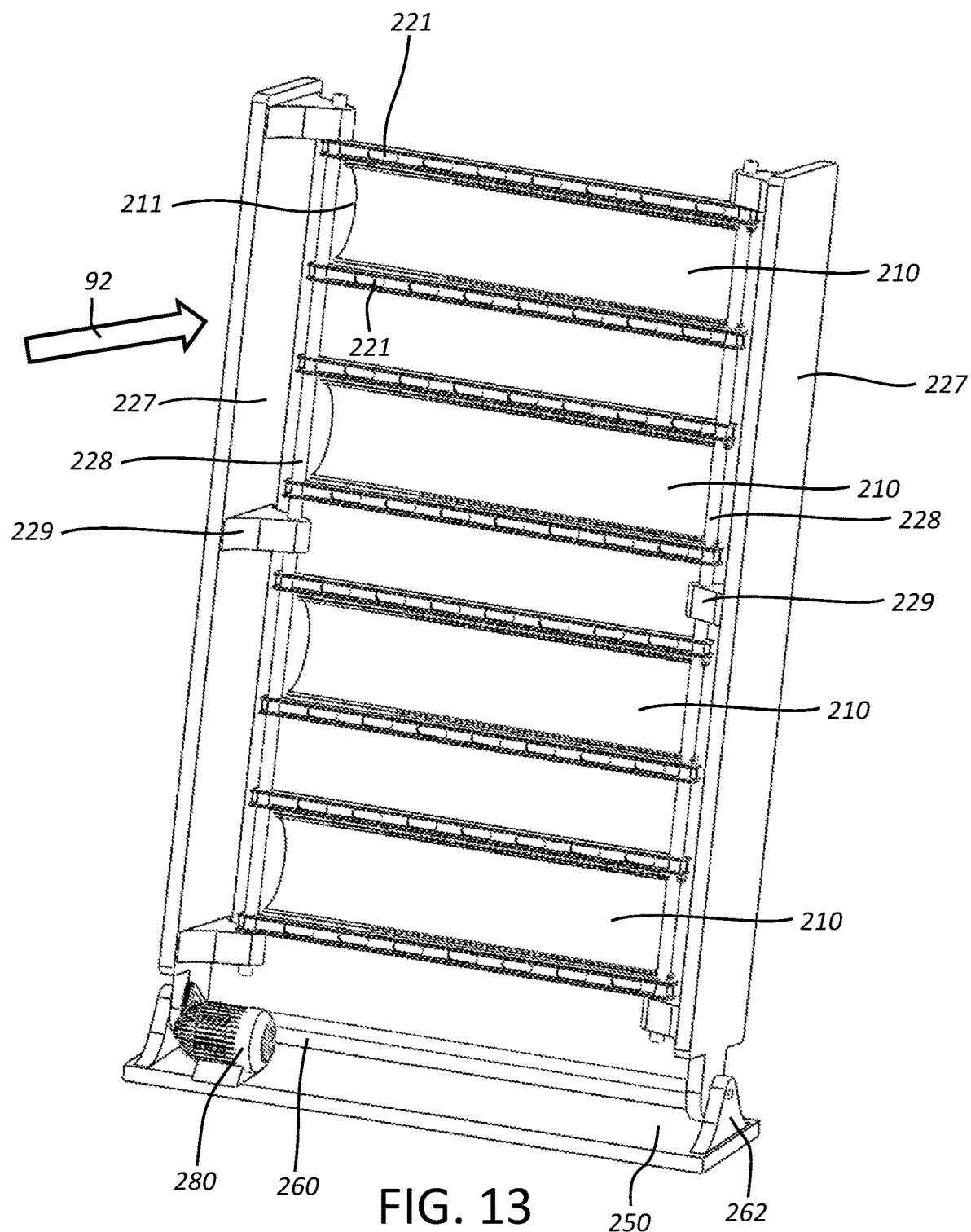
FIG. 13 illustrates an isometric view of multiple horizontal rows of wave energy panels connected to a common generator, in accordance with certain embodiments.

In certain embodiments, FIG. 13 illustrates energy absorbing panels 210 arranged in a horizontal configuration. The panel horizontal supports 221 may be attached to support rods 228 which are attached to support brackets 229 which are attached to support frame 227. The support frames pivot about axle 260 and power is transferred to generator 280. Similar to the configuration in FIG. 11, there may be spaces between adjacent energy absorbing panels 210. While the configuration may lose the ability to easily reduce the exposed area of the energy absorbing panels by moving them horizontally, it may be possible to move the energy absorbing panels 210 vertically, thereby eliminating the space between adjacent panels. Without the space between adjacent energy absorbing panels, the drag coefficient may be reduced, thereby further reducing the absorbed energy. Continuing to move the energy absorbing panels 210 vertically may reduce the opening between the panel horizontal supports 221, which would reduce the area of the energy absorbing panels 210 exposed to the horizontal orbital velocity 92, and the energy absorbed.

Figure 14:
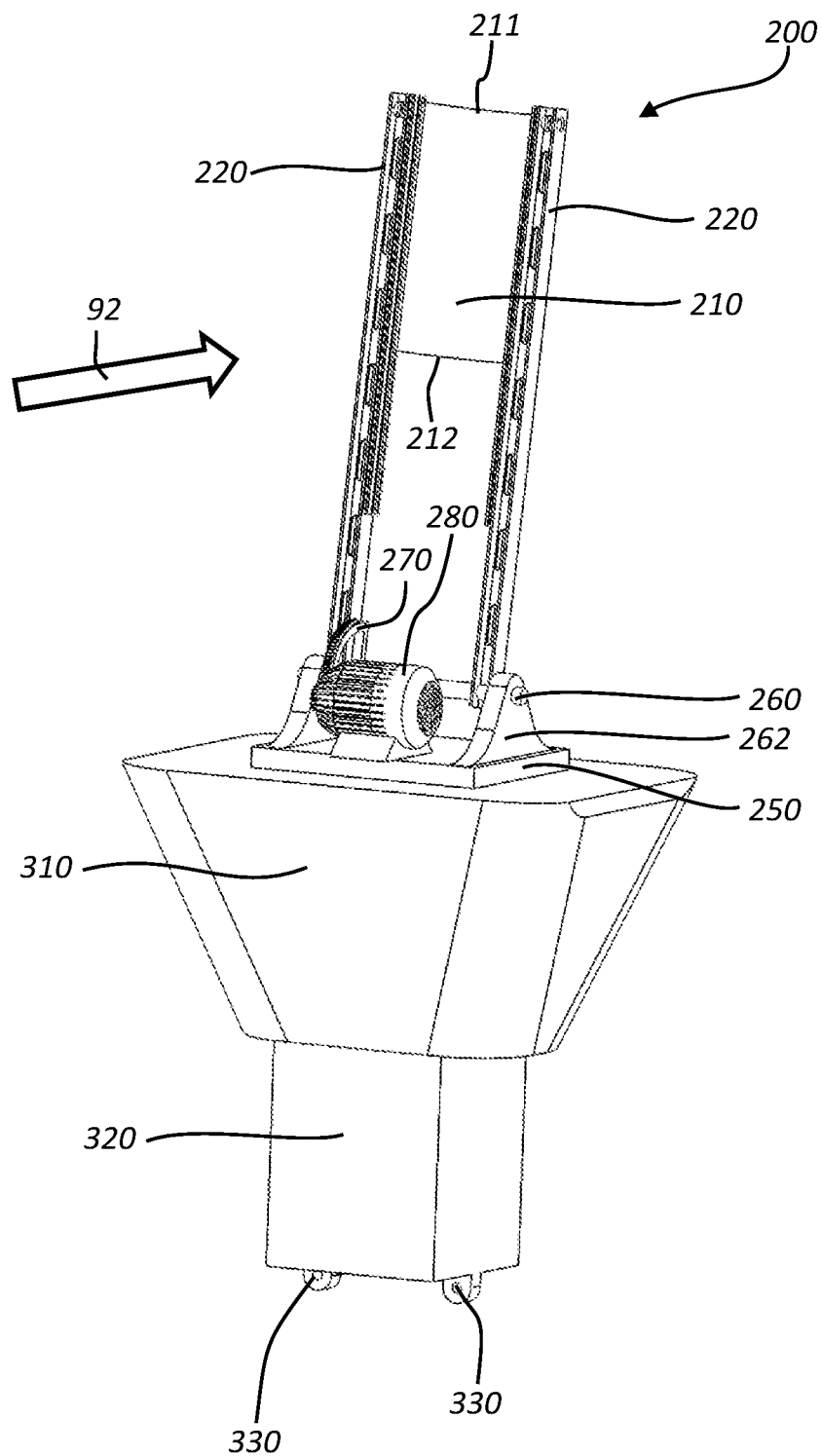
FIG. 14 illustrates an isometric view of a wave energy panel mounted on a floating platform with a pendulum weight in accordance with certain embodiments.
Figure 15:
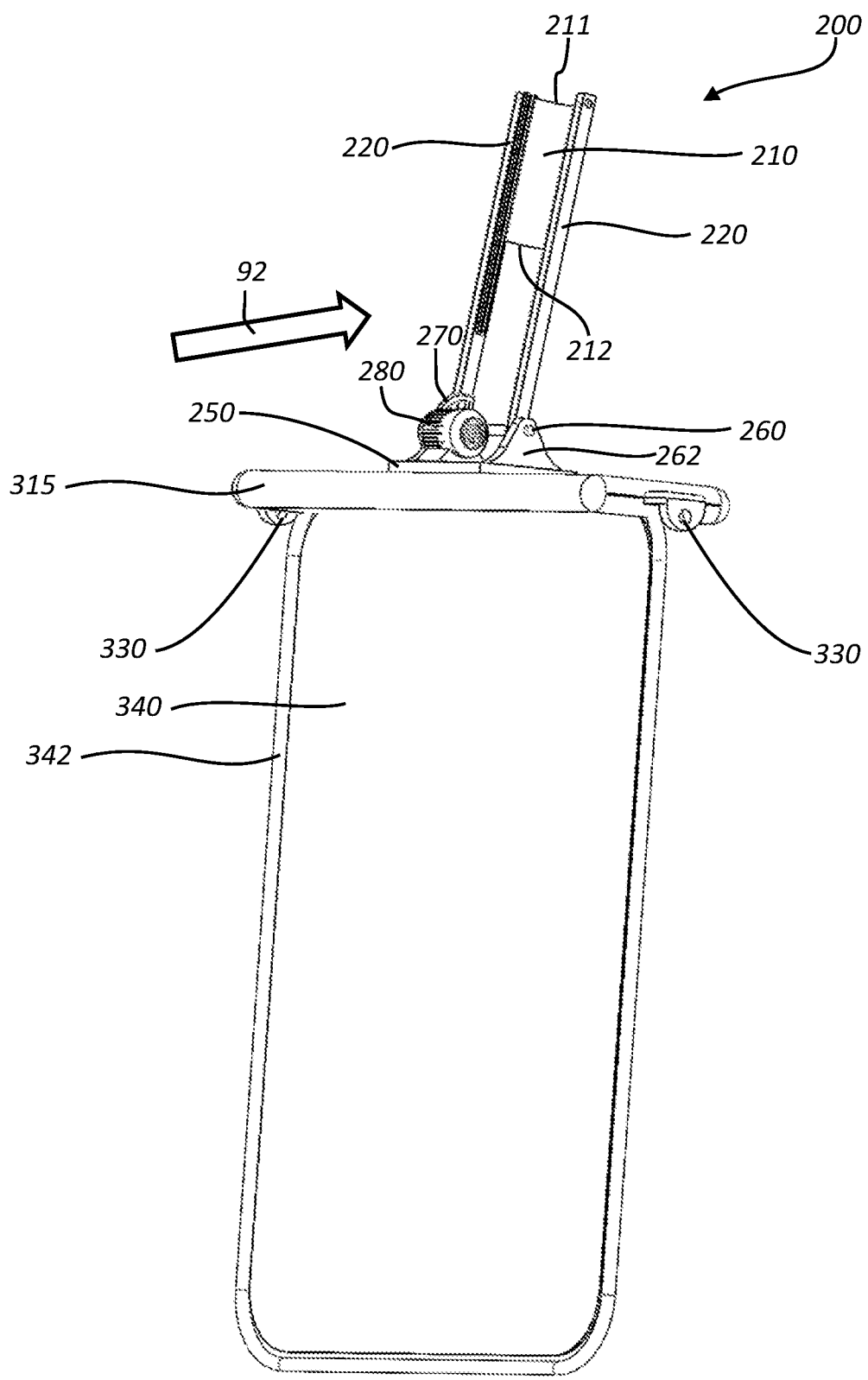
FIG. 15 illustrates an isometric view of a wave energy panel mounted on a floating platform with a vertical sail in accordance with certain embodiments.

In certain embodiments shown in FIGS. 14 and 15 the WEP 200 may be installed in deep water where the water depth does not permit securing the WEP base 250 to the sea floor 208. These configurations may be secured to the sea floor by mooring lines attached to mooring attachment points 330. Certain embodiments shown in FIG. 14 may combine a buoyant block 310 with a counterweight 320 to create a floating pendulum. The counterweight 320 and the distance to the center of mass may be designed so that the WEP base 250 remains stationary when the torque developed by the energy absorbed by the WEP 200 is applied to the generator 280. Certain embodiments shown in FIG. 15 may utilize a large sail 340 area to resist the torque. As described previously, large sail areas may add significant mass to move through the water. The sail may be supported along its perimeter by a frame 342 designed for the situs. The sail may have additional buoyancy 315 attached to provide an additional restoring force to resist the applied torque. The result may be a lighter WEP system requiring less buoyancy than the floating pendulum embodiment of FIG. 14.

As noted above, certain embodiments may be configured to function optimally with the features of a selected situs. "Situs" as used here, means a location selected for installing and operating the ocean wave energy absorbing kite system of the present invention. In accordance with the method for efficiently harnessing kinetic energy of ocean wave of the present invention, a proper situs must be selected and then the system of certain embodiments must be configured for the selected situs. As noted above, for an exemplary installation near a shoreline, with a situs mean depth of 15 m and a wave height of 3 m, the vertical extent or height of the energy absorbing panel may be about 7.5 m and the panel may form a concave shape where the radius of curvature is less than $1/20$ of the wave height. Thus, for a selected situs having a selected wave height and mean depth, the radius of curvature of the concave shape of the energy absorbing panel may be less than ¼ of the wave height and the height of the energy absorbing panel may be between ⅓ and ⅔ of the mean depth.

Certain embodiments have been shown and described herein with an energy absorbing panel that may employ a concave shape. While the concave shape produces the highest drag coefficient listed in FIG. 1A, the open triangular shape produces virtually the same drag coefficient. Variations in the shape of the reversable energy absorbing panel are within the scope of certain embodiments.

The system and method of certain embodiments provides a practical and economical way to generate energy from ocean waves and is more economical to install and operate than previous systems.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not a limitation of the invention.

I claim:

1. A wave energy extraction system, comprising:
   a wave energy panel, comprising:
      a first support member;
      a second support member spaced a fixed distance apart from the first support member;
      a flexible membrane extending between the first support member and the second support member and having a radius that is less than 25% of a maximum wave height;
      a buoyant block attached to the wave energy panel;
      a counterweight or an anti-rotation sail attached below the buoyant block; and
      a plurality of mooring attachment points for mooring the wave energy extraction system to the ocean floor;
   wherein the flexible membrane is configured to be pushed into a concave shape by a first horizontal wave velocity in a forward direction and into a reverse concave shape by a second horizontal wave velocity in a reverse direction opposite to the forward direction causing the wave energy panel to pivotably reciprocate between a first position and a second position; and
   a power extraction device operably connected to the wave energy panel so that the reciprocation of the wave energy panel in response to waves transfers power to the power extraction device.

2. The wave energy extraction system of claim 1, wherein the first support member and the second support member define a plane.

3. The wave energy extraction system of claim 1, wherein the radius is equal to one-half of the fixed distance.

4. The wave energy extraction system of claim 1, wherein the wave energy panel is configured to be aligned with a wave front to increase the power generation capability of the wave extraction system.

5. The wave energy extraction system of claim 1, wherein the power extraction device comprises at least one of a generator and a hydraulic pump.

6. The wave energy extraction system of claim 5, wherein the hydraulic pump is operably connected to a reverse osmosis system.

7. The wave energy extraction system of claim 1, further comprising a plurality of wave energy panels.

8. The wave energy extraction system of claim 7, wherein the plurality of wave energy panels is arranged in a single row.

9. The wave energy extraction system of claim 7, wherein the plurality of wave energy panels is arranged in a plurality of staggered rows.

10. The wave energy extraction system of claim 7, wherein the plurality of wave energy panels is operably connected to a single power extraction device.

11. The wave energy extraction system of claim 7, wherein the plurality of wave energy panels is operably connected to a plurality of power extraction devices.

12. The wave energy extraction system of claim 1, wherein the flexible membrane is slidably attached to the first support member and the second support member to allow the flexible membrane to be raised and lowered in the wave energy panel to adjust the power generated by the wave energy extraction system.

13. The wave energy extraction system of claim 1, wherein the wave energy extraction system is configured to be attached to an ocean floor in shallow water.

14. The wave energy extraction system of claim 1, wherein the flexible membrane further comprises an upper edge, a lower edge and a longitudinal axis; and the wave energy panel further comprises rigid end caps located at the upper edge and the lower edge to reduce flow along the longitudinal axis.

15. The wave energy extraction system of claim 1, wherein the flexible membrane further comprises an upper edge, a lower edge and a longitudinal axis; and the wave energy panel further comprises flexible end caps located at the upper edge and the lower edge to reduce flow along the longitudinal axis.

16. The wave energy extraction system of claim 1, wherein the wave energy panel can rotate from vertical to horizontal to stop energy absorption to protect it from damage in extreme seas or during periods where it is not desired to remove wave energy.

17. A method of extracting wave energy, comprising:
   providing a wave energy panel, comprising:
      a first support member;
      a second support member spaced a fixed distance apart from the first support member;
      a flexible membrane extending between a first support member and a second support member and having a radius that is less than 25% of a maximum wave height;
      a buoyant block attached to the wave energy panel;
      a counterweight or an anti-rotation sail attached below the buoyant block; and
      a plurality of mooring attachment points for mooring the wave energy extraction system to the ocean floor;
   applying a first horizontal wave velocity in a forward direction to push the flexible membrane into a concave shape and applying a second horizontal wave velocity in a reverse direction opposite to the forward direction to push the flexible membrane into a reverse concave shape, thereby causing the wave energy panel to pivotably reciprocate between a first position and a second position; and operably connecting a power extraction device to the wave energy panel so that the reciprocal motion of the wave energy panel in response to waves transfers power to the power extraction device.

18. The method of claim 17, wherein the first support member and the second support member define a plane.

19. The method of claim 17, wherein the radius is equal to one-half of the fixed distance.

20. The method of claim 17, further comprising aligning the wave energy panel with a wave front to increase the power generation capability of the wave energy panel.

21. The method of claim 17, further comprising attaching the wave energy panel to an ocean floor in shallow water.

22. The method of claim 17, further comprising rotating the wave energy panel from vertical to horizontal to stop energy absorption to protect it from damage in extreme seas or during periods where it is not desired to remove wave energy.

23. A wave energy extraction system, comprising:
a wave energy panel, comprising:
  a first support member;
  a second support member spaced a fixed distance apart from the first support member;
  a flexible membrane extending between the first support member and the second support member and having a first surface and a second surface opposite the first surface;
  a buoyant block attached to the wave energy panel;
  a counterweight or an anti-rotation sail attached below the buoyant block; and
  a plurality of mooring attachment points for mooring the wave energy extraction system to the ocean floor;
wherein the flexible membrane is configured to be pushed into a concave shape by a first horizontal wave velocity impinging on the first surface in a forward direction and into a reverse concave shape by a second horizontal wave velocity impinging on the second surface in a reverse direction opposite to the forward direction, causing the wave energy panel to pivotably reciprocate between a first position and a second position; and wherein the concave shape of the flexible membrane increases the drag coefficient on the first surface of the flexible membrane when it is impinged upon by the first horizontal velocity while reducing the drag coefficient of the second surface of the flexible membrane which is pushed through the water and the reverse concave shape of the flexible membrane increases the drag coefficient on the second surface of the flexible membrane when it is impinged upon by the second horizontal wave velocity while reducing the drag coefficient of the first surface of the flexible membrane which is pushed through the water, thereby increasing power generation of the wave energy panel in the forward and reverse directions during reciprocation; and a power extraction device operably connected to the wave energy panel so that the reciprocation of the wave energy panel in response to waves transfers power to the power extraction device.

24. The wave energy extraction system of claim 23, wherein the first support member and the second support member define a plane.

25. The wave energy extraction system of claim 23, wherein for the concave shape the drag coefficient of the second surface of the flexible membrane is less than 60% of the drag coefficient of the first surface of the flexible membrane.

26. The wave energy extraction system of claim 23, wherein for the reverse concave shape the drag coefficient of the first surface of the flexible membrane is less than 60% of the drag coefficient of the second surface of the flexible membrane.

27. The wave energy extraction system of claim 23, wherein the flexible membrane has a radius that is less than 25% of a maximum wave height.

28. The wave energy extraction system of claim 23, wherein the radius is equal to one-half of the fixed distance.

* * * * *